(12) United States Patent
Riva

(10) Patent No.: US 11,026,400 B1
(45) Date of Patent: Jun. 8, 2021

(54) WATER WHEEL PET FOUNTAIN

(71) Applicant: Darren Riva, New York, NY (US)

(72) Inventor: Darren Riva, New York, NY (US)

( * ) Notice: Subject to any disclaimer, the term of this patent is extended or adjusted under 35 U.S.C. 154(b) by 201 days.

(21) Appl. No.: 16/290,419

(22) Filed: Mar. 1, 2019

Related U.S. Application Data

(60) Provisional application No. 62/637,678, filed on Mar. 2, 2018.

(51) Int. Cl.
*A01K 7/02* (2006.01)
*F03B 7/00* (2006.01)

(52) U.S. Cl.
CPC ............... *A01K 7/02* (2013.01); *F03B 7/003* (2013.01)

(58) Field of Classification Search
CPC .. A01K 7/005; A01K 7/02; A01K 7/00; F03B 7/003
USPC ...................................................... 119/72, 74
See application file for complete search history.

(56) References Cited

U.S. PATENT DOCUMENTS

| | | | | |
|---|---|---|---|---|
| 329,351 A | * | 10/1885 | Williamson | ............. F04B 19/14 198/702 |
| 849,859 A | * | 4/1907 | Scott | ......................... F03B 1/04 415/186 |
| 2,275,887 A | * | 3/1942 | Chandler | ................ A01K 39/04 119/56.1 |
| 2,877,051 A | * | 3/1959 | Cushman | ................. B05B 17/08 239/17 |
| 3,901,191 A | * | 8/1975 | Smith | ................... A01K 5/0216 119/51.03 |
| 4,024,066 A | * | 5/1977 | von Boehn | .......... B01D 33/327 210/330 |
| 4,516,748 A | * | 5/1985 | Nix | ......................... B60T 11/16 192/115 |
| 4,640,478 A | * | 2/1987 | Leigh-Monstevens | ... F16B 9/09 248/27.1 |
| 4,896,627 A | * | 1/1990 | Riddell | ................ A01K 5/0142 119/51.5 |
| 5,329,876 A | * | 7/1994 | Tracy | ..................... A01K 5/015 119/51.03 |
| 6,526,916 B1 | | 3/2003 | Perlsweig | |
| 6,588,368 B1 | | 7/2003 | Cheng | |
| 6,640,748 B1 | | 11/2003 | Cheng | |
| 6,810,830 B1 | | 11/2004 | Cheng | |
| 7,644,685 B2 | | 1/2010 | Groh et al. | |
| 7,757,636 B2 | | 7/2010 | McCallum et al. | |

(Continued)

FOREIGN PATENT DOCUMENTS

| CN | 204961766 U | * | 1/2016 |
|---|---|---|---|
| KR | 2003034658 A | * | 5/2003 |

*Primary Examiner* — Tien Q Dinh
*Assistant Examiner* — Zoe Tam Tran
(74) *Attorney, Agent, or Firm* — Zollinger & Burleson, Ltd.

(57) ABSTRACT

A water wheel pet fountain includes a lower basin that holds water, a water wheel that lifts water from the lower basin and delivers it to a collector that has an outlet or spout that allows the water to exit the collector and fall back down into the lower basin in an exposed stream accessible to pets for drinking. A motor is removably carried on the basin and a removable cowl covers the water wheel. The fountain can be taken apart for cleaning and the electronics and motor can be separated from the components being cleaned. The parts that contact water have large fillets and can be made with an antimicrobial plastic.

19 Claims, 18 Drawing Sheets

(56) References Cited

U.S. PATENT DOCUMENTS

| | | | |
|---|---|---|---|
| 7,918,186 B2 | 4/2011 | Rowe et al. | |
| D637,770 S | 5/2011 | Lipscomb et al. | |
| 8,104,431 B2 | 1/2012 | Klenotiz | |
| D658,818 S | 5/2012 | Lipscomb | |
| D658,819 S | 5/2012 | Lipscomb et al. | |
| D659,300 S | 5/2012 | Lipscomb | |
| D659,301 S | 5/2012 | Lipscomb et al. | |
| D659,914 S | 5/2012 | Lipscomb | |
| D665,134 S | 8/2012 | Lipscomb et al. | |
| 8,245,665 B2 | 8/2012 | Willett | |
| 8,261,696 B1 | 9/2012 | Lipscomb et al. | |
| 8,307,878 B2 * | 11/2012 | Faller | E06B 9/50 |
| | | | 160/310 |
| 8,381,685 B2 | 2/2013 | Lipscomb et al. | |
| D681,887 S | 5/2013 | Fang | |
| D681,888 S | 5/2013 | Fang | |
| D692,623 S | 10/2013 | Lipscomb | |
| D695,972 S | 12/2013 | Lipscomb | |
| D699,901 S | 2/2014 | McCallum et al. | |
| D704,389 S | 5/2014 | Fang | |
| D704,390 S | 5/2014 | Tan | |
| D704,391 S | 5/2014 | Tan | |
| 8,733,295 B2 | 5/2014 | Lipscomb et al. | |
| D709,654 S | 7/2014 | Lipscomb et al. | |
| D709,655 S | 7/2014 | Lipscomb | |
| 8,763,557 B2 | 7/2014 | Lipscomb et al. | |
| 8,770,148 B2 | 7/2014 | Lipscomb et al. | |
| 8,800,494 B2 | 8/2014 | Lipscomb et al. | |
| 8,813,683 B2 | 8/2014 | Lipscomb et al. | |
| D717,006 S * | 11/2014 | Alfonso | A01K 5/0142 |
| | | | D30/129 |
| 8,899,182 B2 | 12/2014 | Lipscomb et al. | |
| 8,960,126 B2 | 2/2015 | Lipscomb et al. | |
| 8,985,054 B2 | 3/2015 | Lipscomb et al. | |
| 9,113,610 B2 | 8/2015 | Lipscomb et al. | |
| 9,258,979 B2 | 2/2016 | Alexander | |
| 9,402,375 B2 | 8/2016 | Lipscomb | |
| 9,474,249 B2 | 10/2016 | Lipscomb | |
| 9,485,961 B2 | 11/2016 | Briski | |
| 9,497,930 B2 | 11/2016 | Lipscomb et al. | |
| 9,510,561 B2 | 12/2016 | Lipscomb et al. | |
| 9,572,323 B2 | 2/2017 | Lipscomb et al. | |
| 9,730,427 B2 | 8/2017 | Lipscomb et al. | |
| 9,826,712 B2 | 11/2017 | Lipscomb et al. | |
| 9,930,867 B2 | 4/2018 | Lipscomb | |
| 9,943,064 B2 | 4/2018 | Farris | |
| D827,213 S | 8/2018 | Veness et al. | |
| 10,194,637 B2 | 2/2019 | Armstrong | |
| 10,787,370 B2 * | 9/2020 | Mainini | C02F 1/281 |
| 2017/0245465 A1 | 8/2017 | Oates | |
| 2018/0177152 A1 | 6/2018 | Lipcomb | |
| 2018/0338470 A1 | 11/2018 | Sayers | |
| 2019/0098866 A1 * | 4/2019 | Paxson | F04B 23/021 |

\* cited by examiner

WATER WHEEL PET FOUNTAIN

CROSS-REFERENCE TO RELATED APPLICATIONS

This application claims the benefit of U.S. Provisional Patent Application No. 62/637,678 filed Mar. 2, 2018; the disclosures of which are incorporated herein by reference.

BACKGROUND OF THE DISCLOSURE

1. Technical Field

This disclosure generally relates to devices and methods for providing drinking water to house pets and, more particularly, to a device and method that uses a water wheel to lift drinking water from a basin to create a flow of water accessible to the pet. The disclosure also relates to a device that can be readily disassembled for cleaning, that uses a single-size filter in different locations, and minimizes biofilm and bacteria growth.

2. Background Information

Pet water fountains provide running streams of water for cats, dogs and other pets. They often feature a basin from which the pet can drink water from in addition to a continually running stream of water which flows into the basin. Pets have a tendency to like running streams of water. Dogs may seek out streams of water in the woods and cats will often jump on kitchen counter tops to slurp water coming from a faucet. For this reason Pet Fountains are used to promote pet health by encouraging pets to drink more water.

While many varieties of pet fountains exists on the market today they do have drawbacks which impact the quality of the water in the fountains. Design flaws make them difficult to thoroughly clean in addition to taking longer to clean. There are three noteworthy design flaws which come to mind: pet fountains make use of stator pumps which are challenging to disassemble and reassemble, they use plastic materials not treated with antimicrobial additives and they have corners and crevices which are difficult to clean.

Most pet fountains today make use of small stator pumps. These pumps are typically 35 mm×35 mm×35 mm and powered by DC current. The challenge with these pumps are they are difficult to open and clean leading owners to often neglect cleaning the insides of these pumps. It is also time consuming to take these pumps apart. In addition, given that the electronics are embedded in the pumps, these pumps cannot be placed in dishwashers so they can be thoroughly cleaned.

Another challenge with these small stator pumps is how long they last. These pumps have small motors which typically run at very high speeds continuously. The motors in these small stator pumps often fail leading to owner frustration.

Over time owners of pet fountains notice slime in the water if the pet fountain are not cleaned routinely. The slime in pet fountains typically starts with the growth of a thin layer of biofilm on the surfaces of the pet fountain. The majority of pet fountains are typically constructed from plastics. If pet fountains are not routinely cleaned by owners a biofilm can start to build up on the plastic surfaces. Microorganisms that form biofilms include bacteria, fungi and protists. Some manufacturers produce stainless steel or ceramic pet fountains which may resist biofilm growth but these too come with challenges. Stainless steel with time and constant exposure to water stains and cannot be easily cleaned. Ceramic pet fountains are typically heavy, more difficult to refill and clean due to their weight, in addition, ceramic is typically more expensive. There is a need for an improved plastic pet fountain.

BRIEF SUMMARY OF THE DISCLOSURE

The present application relates to water devices for animals, such as pet fountains, and their methods of use. In particular embodiments, the water device includes a water wheel utilized to elevate water from a lower basin of water to a higher collector of water, whereby the water flows back to the lower basin in the form of a flowing, continuous stream of water from a spout in the collector. This flow is accessible to a pet for drinking. The wheel includes several buckets. When the wheel rotates, the buckets scoop water from the lower basin and raise the water to the collector. This features allows for water to be elevated without the use of a stator pump which is commonly used pump in pet fountains.

Another feature of the disclosure is a collector that slides into a slot on the lower basin. Once the collector is slid into the slot in the lower basin it is perfectly located to collect the falling streams of water from the buckets of the wheel. The addition of a cowl then locks the collector in place.

Another feature of the disclosure is that a cut out in the front wall of each bucket on the wheel enables water to be drained from the bucket as the wheel rotates. This cut out equalizes the amount of water carried up in the bucket regardless if there is a shallow amount of water in the lower basin or a deeper amount of water in the lower basin. This feature enables a steady stream of water to come from the spout of the collector.

Another feature of the disclosure is that the size of the buckets enable the buckets to be easily hand cleaned. The gap between buckets is sized so that large fingers can reach in to each bucket so it can be easily hand cleaned with a sponge or cloth.

Another feature of the disclosure is the use of small holes in the buckets to release air bubbles. When the water level in the lower basin reaches the maximum water level more air can be trapped in the bucket as it submerges into the water. Between four o'clock and six o'clock theses air bubbles can become trapped. By including a small hole or holes in the upper most portions of the bucket air is allowed to escape. This features enables the water device to run quieter with less gurgling noise coming from escaping air.

Another feature of the disclosure is that each bucket in the wheel has channel walls which directs the water leaving the bucket into a single narrow stream of water. This features enables the water to not drip in an under controlled manner back into the lower basin.

Another feature of the disclosure is that the curved shape of the buckets of the wheel allow for the water to be discharged to a collector in the center of the wheel. As the wheel rotates and a bucket reaches the eleven o'clock position the water begins to discharge into the collector which is below the bucket. This curved shape of the bucket enables the bucket to be completely drained by the time it reaches the 2:30 o'clock position. This feature allows for controlled flow of the water to the collector. This feature also ultimately allows for the water device to have a thinner profile then if the water were discharged to the front.

Another feature of the disclosure is the collector has an upward protruding shape upon which the stream of water leaving a bucket hits. This feature diverts the stream of water from the bucket to the left and right side walls of the collector. This feature diminishes the pulsing of water by diverting the wave from the water being dropped to the side walls. Ultimately this reduces the pulsing of water seen in the stream of water flowing from the spout.

Another feature of the disclosure is that as water leaves the collector through a spout it falls to a lower basin where it hits a shape which protrudes above the lower basin's maximum water level. This features allows for the water to more quietly transition from the collector spout to the lower basin plus reduces splashing which may occur.

Another feature of the disclosure is that lower basin has two reservoirs. A front reservoir and a rear reservoir. The front reservoir is immediately below the spout and is where the animals can drink from. The rear reservoir is located at the base of the wheel and is where the wheel begins to scoop up water. The front reservoir floor is at a higher elevation than the rear reservoir floor which allows water to drain from the front reservoir to the rear reservoir. The front reservoir is visible to the user where the rear reservoir is not visible. These features allows for the water level of the watering device to look empty to the user giving them a visual cue to refill the water device before it is completely empty.

Another feature of the disclosure is the shape of the filters. Upon basing from the upper elevation portion of the lower basin to the lower elevation the water passes through two filters. The shape of the filter permits the two filters to be interchangeable, there is no left side only filter and right side only filter. This features enhances simplicity of set up for the user.

Another feature of the disclosure is that shape of the lower basin is that it is purposely designed to eliminate sharp corners and tight crevices while being made from antimicrobial plastics. Bacteria, fungi and protozoa can more easily begin to grow when water does not move. This feature enables the slowing of growth of biofilm which contain either bacteria, fungi or protozoa. Providing the portions that are contacted by water with no sharp corners is a feature that can be applied to the water wheel embodiment described herein as well as other pet fountain configurations that use pumps or other water delivery devices.

Another feature of the disclosure is that the wheel includes of two pieces, a front part of the wheel and a back part of the wheel. The front wheel and back wheel come together for a complete wheel. This features enables the wheel to be manufactured in an inexpensive way.

Another feature of the disclosure is the quick disconnect feature of how the center axle of the wheel is supported by two supports allowing for the wheel to rotate and be easily removed by the user. This features enables the wheel to be easily inserted into the lower basin by the user.

Another feature of the disclosure is that each of these two channels carry removable inserts. These inserts perfectly match corresponding axle support points. These removable inserts are a wear point between the wheel and the lower basin. These inserts are made of a material, Delrin® plastic for example, which has high wear characteristics. This feature allows the user to remove this wear point from the watering device to prolong the life of the watering device.

Another feature of the disclosure is the motor housing which also can be removed from the lower basin. The motor housing slides into a channel in the lower basin which correspondingly connects to the wheel. The motor includes a shape which connects to a corresponding shape on the wheel. This connection enables the rotation of the wheel and a quick disconnect. This feature allows the user to easily remove all electronics from the pet fountain so that the watering device can be more thoroughly cleaned, for example, by placing all parts which come in contact with water to be placed into a dishwasher.

Another feature of the disclosure is an automatic motor start switch which start the rotation of the wheel only after a cowl is placed on to the lower basin and the watering device is completely assembled. This features protects the wheel from being damaged by the users while the wheel is in motion and also provides an intuitive, easy way for the user to start the water device.

Another feature of the disclosure is clear panels in the cowl which covers the wheel when assembled. This embodiment has clear windows which enable the user to see the motion of the wheel in water as the water device is working.

The preceding non-limiting features, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
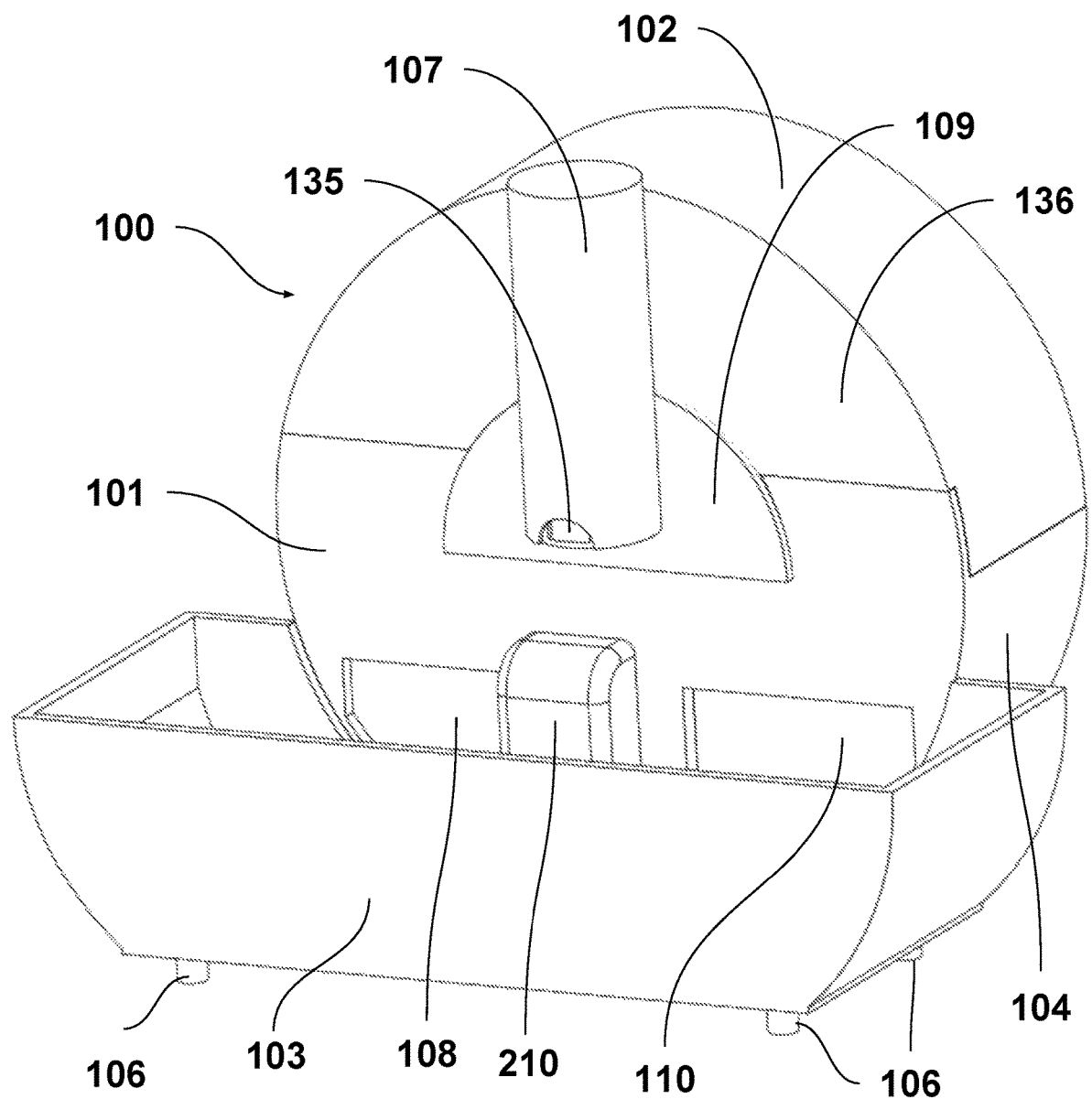
FIG. 1 is a front perspective view of an exemplary embodiment of a water wheel pet fountain.

FIG. 1 illustrates an exemplary configuration of a water wheel pet fountain or watering device 100 viewed from the front. In general, device 100 includes a lower basin 101 that hold water, a water wheel 130 that lifts water from the lower basin 101 and delivers it to a collector 109 that has an outlet or spout 135 that allows the water to exit the collector 109 and fall back down into the lower basin 101 in an exposed stream accessible to pets for drinking. A cowl 102 covers water wheel 130. Cowl 102 can be made from a visually-transparent material to allow the movement of water wheel 130 to be viewed.

The lower basin 101 includes a front reservoir 103 located in the front of the device and a rear reservoir 104 which has a rounded or semi-circular lower wall and is disposed at the rear of watering device 100. The front reservoir 103 includes a water deflector 210 which rises from the front reservoir floor and is positioned below spout 135. Water deflector 210 has a rectangular cross sectional shape when viewed from the top with rounded edges or fillets. Front reservoir 103 is supported by a plurality of front reservoir support feet 106 which have a circular cross section shape. Other shapes, designs and numbers of feet may be used to support front reservoir 103.

Cowl 102 has a semi-circular shape when viewed from the front elevation and has a spout cover 107 which protrudes from cowl front wall 136. Spout cover 107 has a circular shape when viewed from the top elevation and forms a cylinder. In additional embodiments other shapes and designs may be used for spout cover 107. When cowl 102 is positioned, the lower portion of spout cover 107 slides over spout 135. A notch is defined by the lower front end of spout cover 107 so that spout 135 is not blocked. The notch allows water to flow out of spout 135 through cover 107 and down to lower basin 101.

Lower basin 101 was a wall between the front reservoir 103 and the rear reservoir 104. The wall defines two filter inlet holes, a first filter inlet hole 108 and a second filter inlet hole 110. Any of a variety of shapes and number of holes and filters can be used. The filter inlet holes 108 and 110 allow water to flow from the front reservoir 103 to the rear reservoir 104.

The watering device 100 has a collector 109 with a semi-circular shape when viewed from the front elevation which slides in and out of the lower basin 101. Different embodiments of watering device 100 use different shapes and styles for collector 109 which include one embodiment where the collector slides into lower basin 101 from the top, the collector is mounted in the rear of lower basin 101 or a combination of both. In this configuration, collector 109 slides into lower basin 101 front the front of lower basin 101 and is carried by lower basin 101 when in use.

Figure 2:
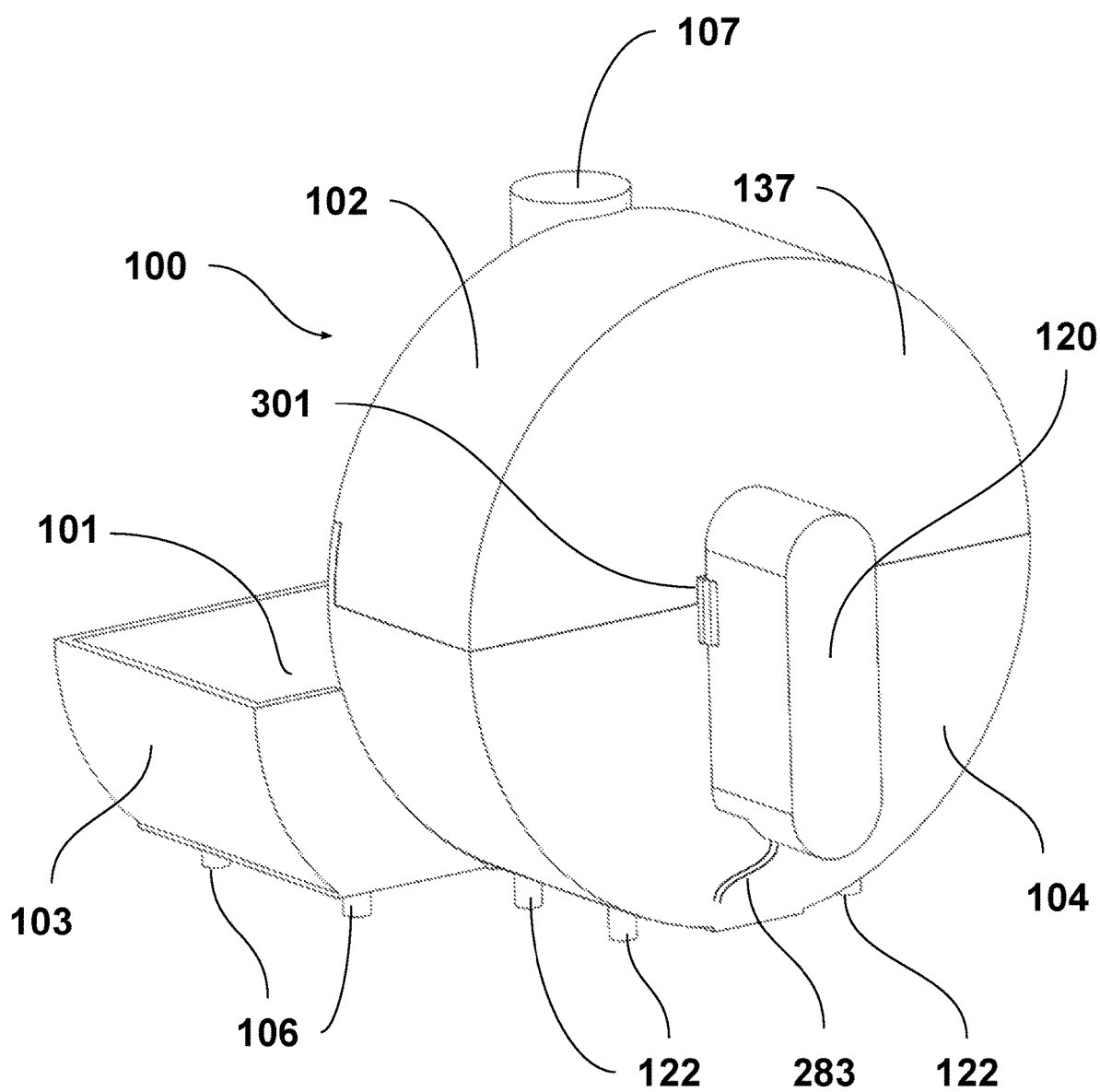
FIG. 2 is a rear perspective view thereof.

FIG. 2 illustrates watering device 100 viewed from the rear. Watering device 100 includes a removable motor housing 120 which is removably carried by the rear of lower basin 101. Motor housing 120 connects to lower basin 101 at the location of two motor housing slots 300 and 301 (FIG. 17) defined by the rear of lower basin 101. Motor housing 120 includes an electronic motor which is powered by electric cord 283 or batteries. Other embodiments feature different methods to connect motor housing 120 to lower basin 101. One embodiment connects motor housing 120 to lower basin 101 with magnets that secure motor housing in place but allow the user to separate motor housing 120 from lower basin 101. Additionally, rear reservoir 104 is supported by rear reservoir support feet 122 which have a circular cross section shape. Other shapes, designs and numbers of feet may be used to support the rear reservoir 104.

Figure 3:
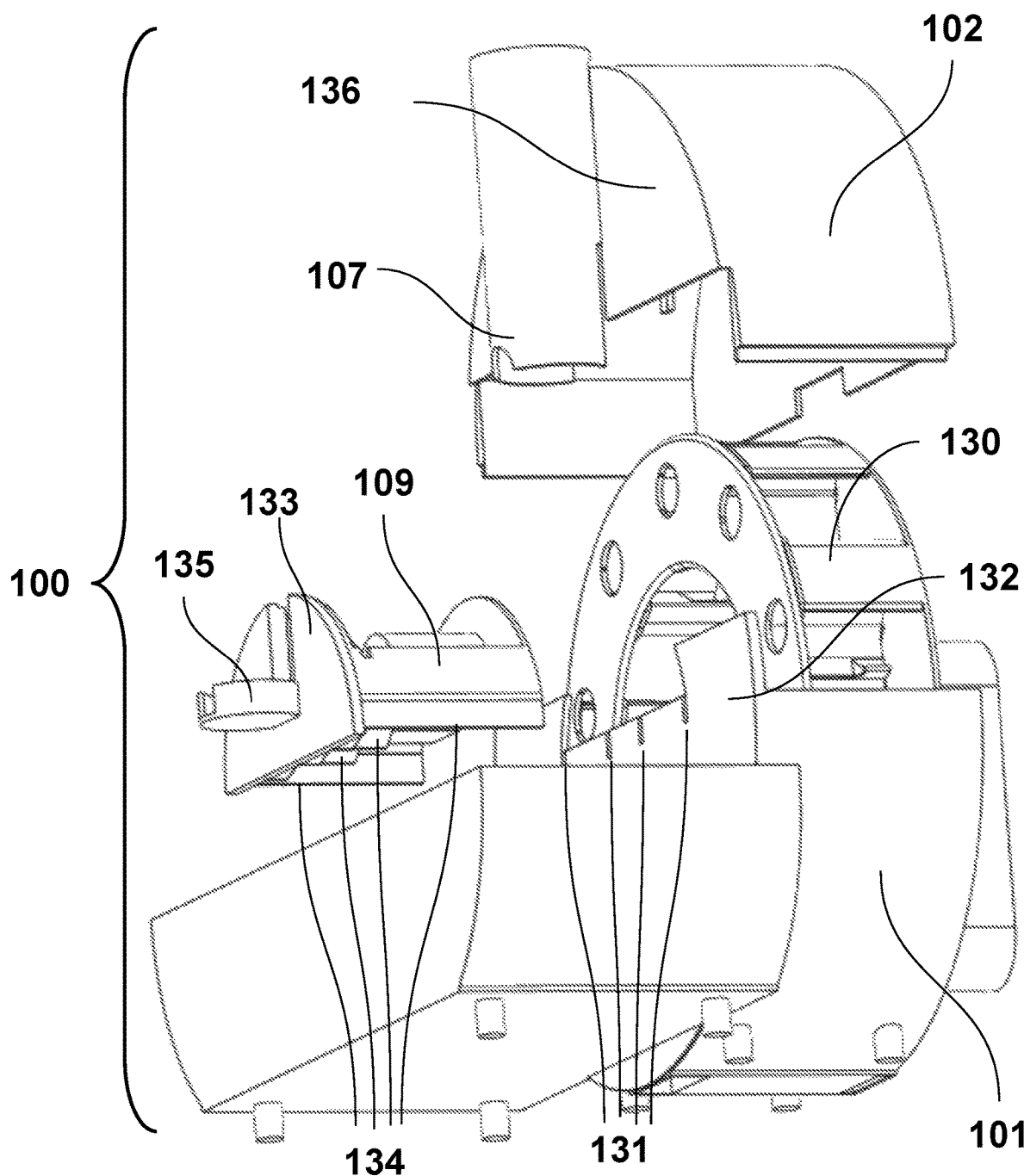
FIG. 3 is a perspective exploded view of the device showing the interlocking relationship of the parts.
Figure 4:
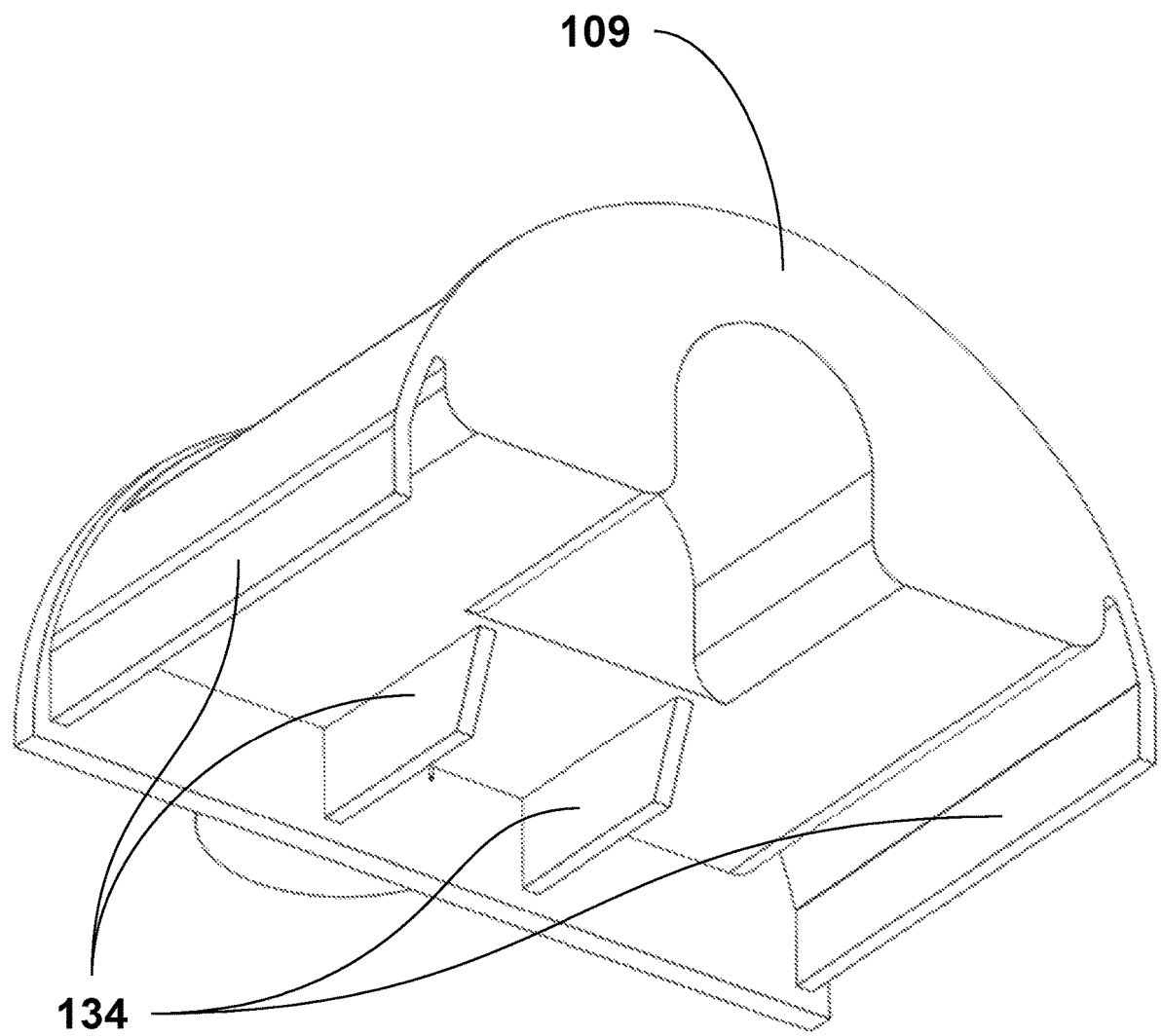
FIG. 4 is a perspective view of the collector as viewed from the bottom rear illustrating the collector guides which interlock with the lower basin.

FIG. 3 illustrates a perspective exploded view of the watering device 100 showing the interlocking relationship of lower basin 101, collector 109 and cowl 102. It also exposes wheel 130 which cowl 102 covers. Similarly FIG. 4 illustrates a perspective view of collector 109 as viewed from the rear bottom. Collector 109 has a plurality of collector guides 134 located on the bottom of collector 109. Four guides 134 are depicted in this embodiment. Returning to FIG. 3, the collector guides 134 match up with collector channels 131 which are defined by the top of the front support wall 132 which is part of the lower basin 101. By aligning the collector guides 134 with the corresponding collector channels 131 the user can slide the collector 109 into lower basin 101 and enable the collector 109 to become carried by lower basin 101. Collector 109 slides into lower basin 101 until the inner surface of front wall 133 engages the outer surface of front support wall 132 to stop the movement of collector 109 any more into lower basin 101. When wall 133 engages wall 132, collector 109 is in the correct position to accept water from wheel 130. The positions of guides 134 and channels 131 can be switched. Other shapes, number of and designs can be used for collector guides 134 and collector channels 131 or in place of collector guides 134 and collector channels 131. Some embodiments may omit grooves and leverage cut-outs through front support wall 132.

In addition, FIG. 3 illustrates collector 109 which includes spout 135 where water pours from when watering device 100 is fully operational. Spout 135 protrudes from collector front wall 133. With collector 109 inserted fully into lower basin 101, cowl 102 can be lowered on to the top of lower basin 101 and in the process spout cover 107 will interlock with spout 135. The circular cross-sectional shape of spout cover 107 is slightly larger in diameter than spout 135 so that when cowl 102 comes to rest on lower basin 101, spout 135 is completely covered by spout cover 107 with water being able to flow though the notch defined by spout cover 107. This interlocking nature of spout cover 107 with spout 135 does not permit collector 109 to be removed from lower basin 101 while watering device 100 is operational. The locked position is depicted in FIG. 1. Other shapes and designs can be used to obtain this interlocking capability which won't allow collector 109 to be removed from lower basin 101.

Figure 5:
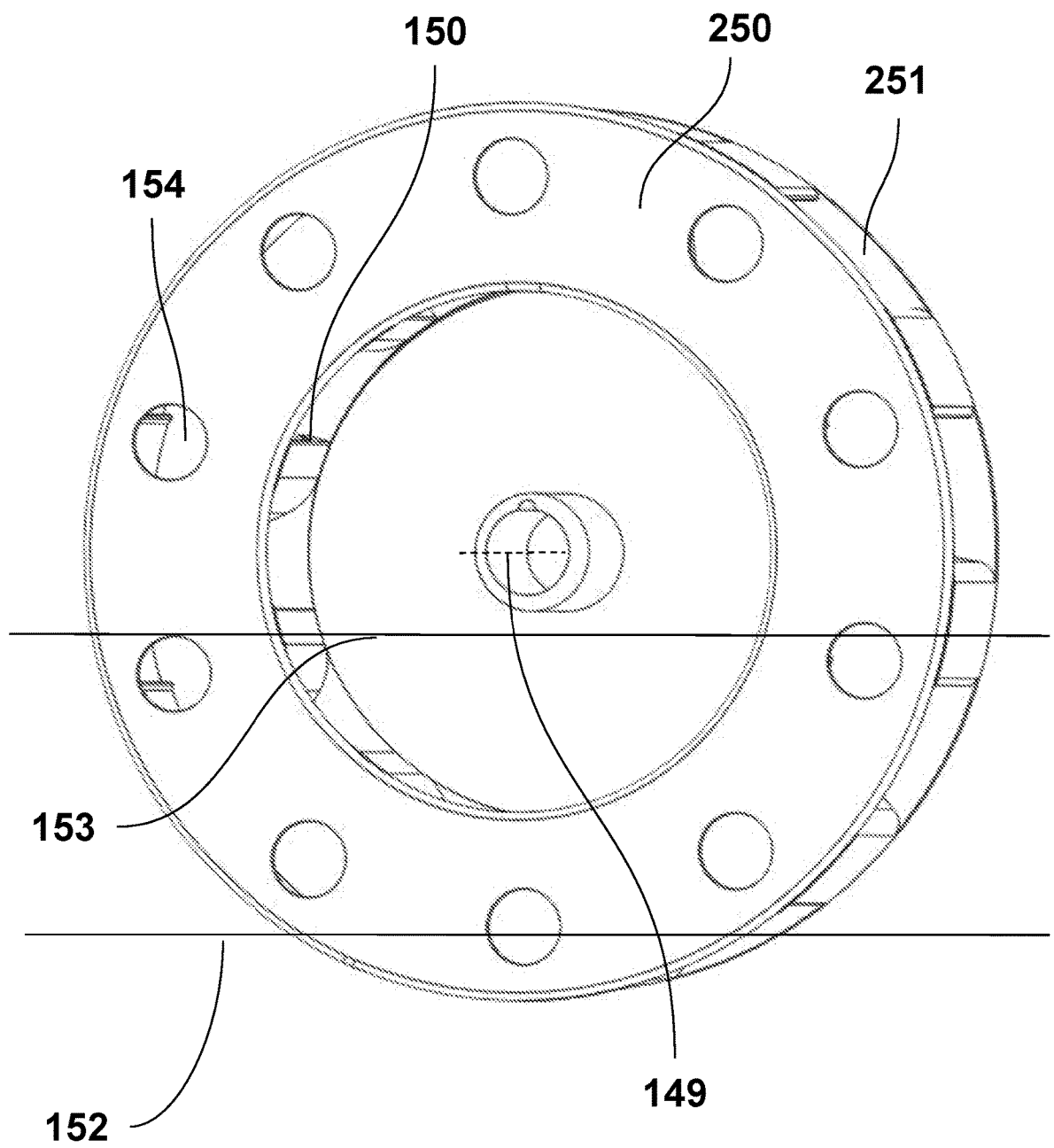
FIG. 5 is a front perspective view of the complete wheel.

FIG. 5 depicts the front of the wheel 130. In this configuration, wheel 130 rotates in a clockwise motion around wheel axis 149 at a speed of approximately nine revolutions per minute. In this particular embodiment wheel 130 includes ten buckets 150. Rotating at this speed, wheel 130 produces a flow of water which is comparable to other stator pump-based pet water fountains which are currently sold. Water wheel 130 delivers from 1500 mL/min to 2800 mL/min of water with a normal operation delivering 1700 mL/min. The flow of water results in a stream of water which is desirable for dogs, cats and other animals. The device can be operated at different speeds such as from four to fourteen revolutions per minute and the size of buckets 150 can be configuration to change the volume of the water flow. To produce an approximately steady stream of water utilizing water wheel 130, each of the ten buckets 150 uses a water leveling hole 154. Water leveling hole 154 can be defined by the front wall 250 or the rear wall of the rear assembly 251 (rear wall and buckets) of water wheel 130. As water wheel 130 rotates in a clockwise motion the bucket 150 approaches water maximum level 153 at the approximately 3:30 o'clock position. Bucket 150 begins to scoop water from the lower basin 101 (see FIGS. 1 and 3) from the rear reservoir 104 (see FIGS. 1 and 3). When bucket 150 approaches approximately position eight o'clock water begins to flow out of water leveling hole 154. This flow of water from water leveling hole 154 allows for a similar amount (within fifteen percent) of water to be in each bucket 150 regardless of whether the water is at a water maximum level 153 or a water minimum level 152. The effect of this feature is to produce a steady stream of water flowing from watering device 100 because the buckets 150 are always emptying about the same volume of water collector 109.

Figure 6:
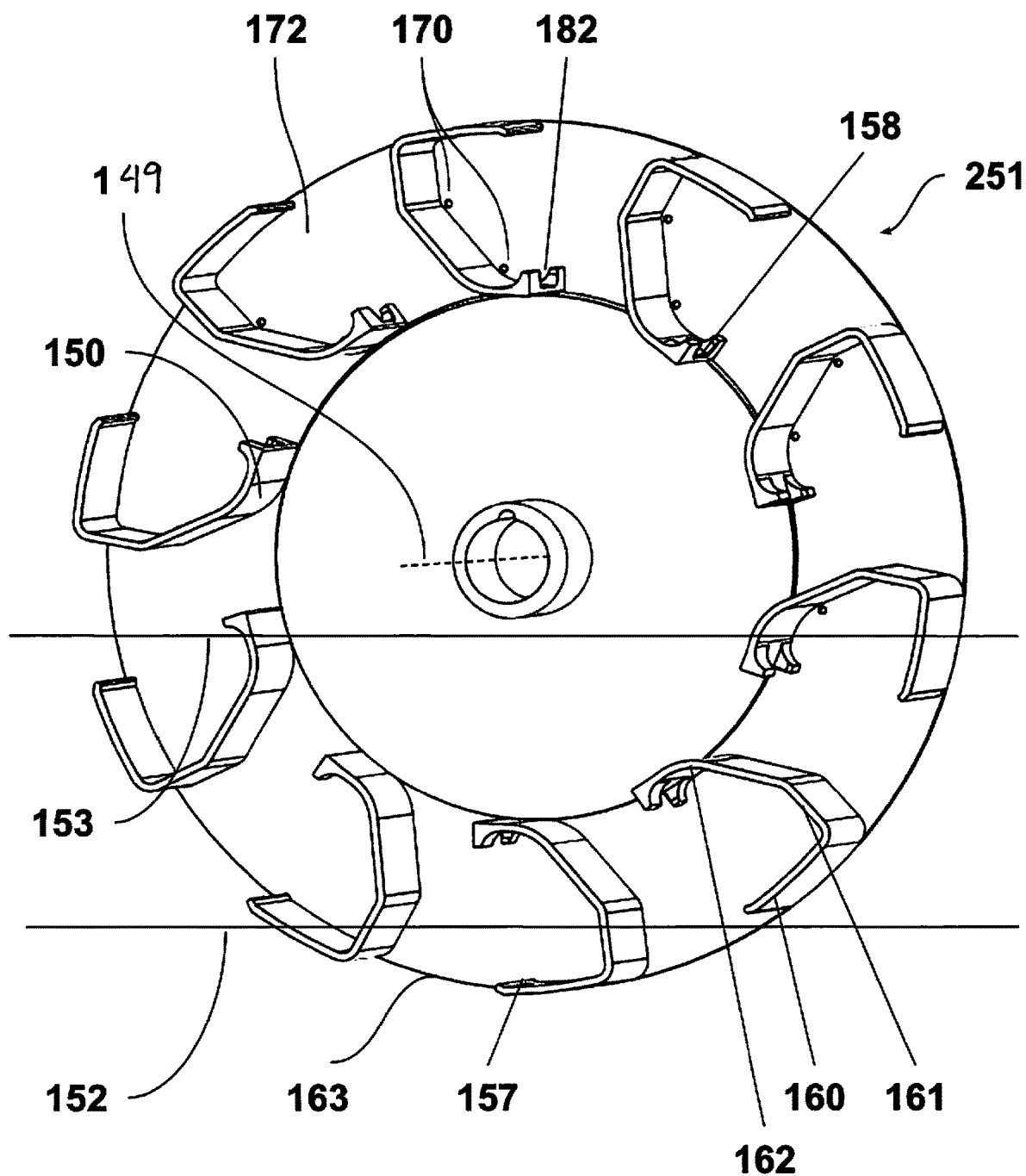
FIG. 6 is a front cross-sectional view of the wheel showing the shape of the internal buckets.

FIG. 6 is a view similar to FIG. 5 with the front wall 250 of water wheel 130 removed. Bucket 150 includes a cross-sectional shape which includes bucket leading edge wall 160 which follows the outer perimeter of the wheel which is the same as wheel outer rim 163. Bucket 150 includes bucket bottom wall 161 which extends generally radially and can approximately follow a straight line drawn from wheel axis 149 to wheel outer rim 163. Bucket 150 cross-sectional shape then follows an approximately 30 degree angle inward direction from a straight line drawn from wheel axis 149 to wheel outer rim 163 which is the bucket dumping wall 162. Bucket dumping wall 162 extends from the inner end of bucket bottom wall 161 and curves to be about tangential to the inner rim of water wheel 130. As wheel 130 rotates in a clockwise manner water is scooped into bucket 150 starting at the leading edge 157 of bucket leading edge wall 160. The process of scooping up water begins at any point between maximum water level 153 and minimum water level 152. As wheel 130 continues to rotate, water fills bucket 150. Bucket 150 is then consider completely full at any point between minimum water level 152 and maximum water level 153, this is typically between approximately seven o'clock and nine o'clock respectively. Hole 154 normalizes the water level. As wheel 130 rotates, the water in bucket 150 moves until it finally reaches dumping edge 158. When bucket 150 reaches the approximately 11:30 o'clock position, the water begins to pour from bucket 150. Between approximately 11:30 o'clock and 1:30 o'clock water is discharged from bucket 150. When bucket 150 reaches approximately 1:30 o'clock approximately all water has been discharged from bucket 150. The sizing of buckets, the number of buckets and the diameter of wheel 130 enable the correct flow of water to mimic stator pumps in current pet fountains.

In addition, the distance between each bucket 150 at rim 163 allows each bucket 150 to be cleaned by allowing the user to insert large fingers holding a sponge, wash cloth, etc. into the bucket for hand cleaning. The distance between buckets may be between 35 mm and 55 mm in general to accommodate having this ability to hand clean the buckets. In this embodiment the distance between buckets is approximately 40 mm. In further embodiments the buckets are constructed differently or rotated in a counterclockwise as opposed to clockwise manner.

With reference to FIG. 6, in operation, when the water level becomes closer to the water maximum level 153 an air bubbles often become trapped in bucket 150 between positions four o'clock and 5:30 o'clock. Subsequently, between positions six o'clock and eight o'clock the air bubbles release from the buckets creating a noise as the air bubbles break the surface of the water. To this point air bubble holes 170 are defined by the rear wall of rear assembly 251 which allows air to escape from the bucket between positions four o'clock and 5:30 o'clock. In this embodiment illustrated in FIG. 6 one air bubble hole 170 is located where bucket leading edge wall 160 and bucket bottom wall 161 meet; and another air bubble hole 170 is located where bucket bottom wall 161 and bucket dumping wall 162 meet. The size of air bubble hole 170 is small enough to let air escape from the bucket but not large enough to allow too much water to escape the bucket in between position seven o'clock and 11:30 o'clock. In this embodiment the diameter of these bubble holes may be approximately 2 mm in diameter. Although being described as holes in this embodiment, certain embodiments of the present disclosure can be constructed with different types of holes such as slots, ovals etc. or different positioning of these holes in other locations of the entire wheel including front wheel wall 250 (see FIG. 5). Additional embodiments may vary the size of the holes and even the number of holes. Other embodiments may exclude this air bubble design altogether. Another embodiment may eliminate the need for air bubble holes by reducing the height of maximum water level 153 by reducing the total height of front reservoir 103.

Figure 7:
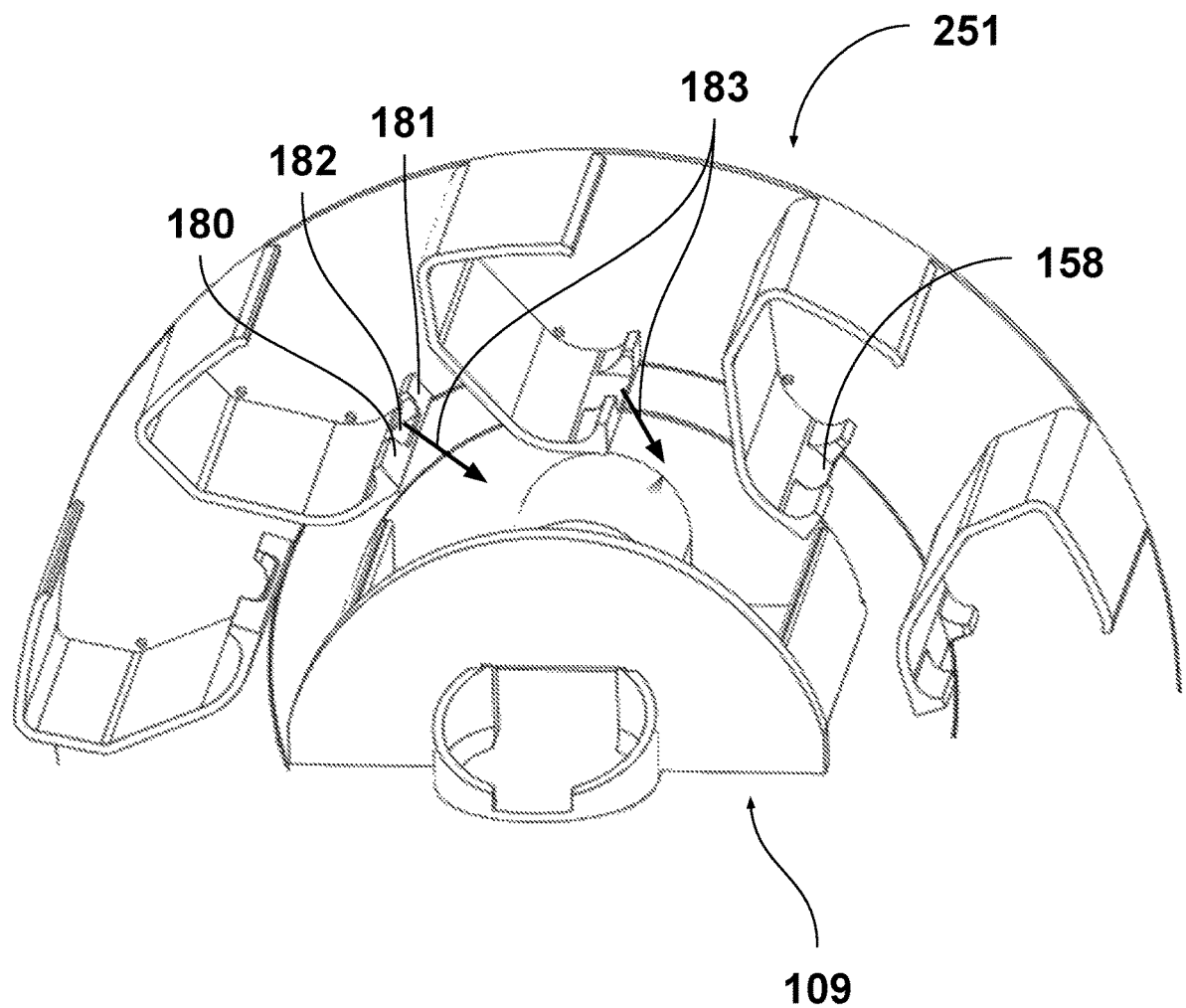
FIG. 7 is a sectional view of the collector and wheel.

FIG. 7 illustrates a perspective front view of wheel 130 with front wheel wall 250 removed to show details of wheel 130 pouring water into collector 109. As wheel 130 rotates in a clockwise manner the water in bucket 150 exits through bucket spout 182. The water is channeled through dumping edge spout wall front 180 and dumping edge spout wall rear 181 to form a single bucket water stream 183. Dumping edge spout wall front 180 and dumping edge spout wall rear 181 are shaped to rise slightly from dumping edge 158 and have a curved shape leading from the dumping edge wall which make the bucket easier to clean. Dumping edge spout wall front 180 and dumping edge spout wall rear 181 extend in from the front wheel wall 250 (not shown in FIG. 7) and rear wheel wall 172 respectively. The sizing of the gap between dumping edge spout wall front 180 and dumping edge spout wall rear 181 allows for water to flow from wheel 130 in single bucket water stream 183 at bucket spout 182 as opposed to leaving bucket 150 in an uncontrolled manner which would spill out in an uncontrolled manner into lower basin 101. Water approximately begins to flow from bucket spout 182 at approximately 11:30 o'clock and completes flowing from bucket spout 182 by approximately 1:00 o'clock.

Figure 8:
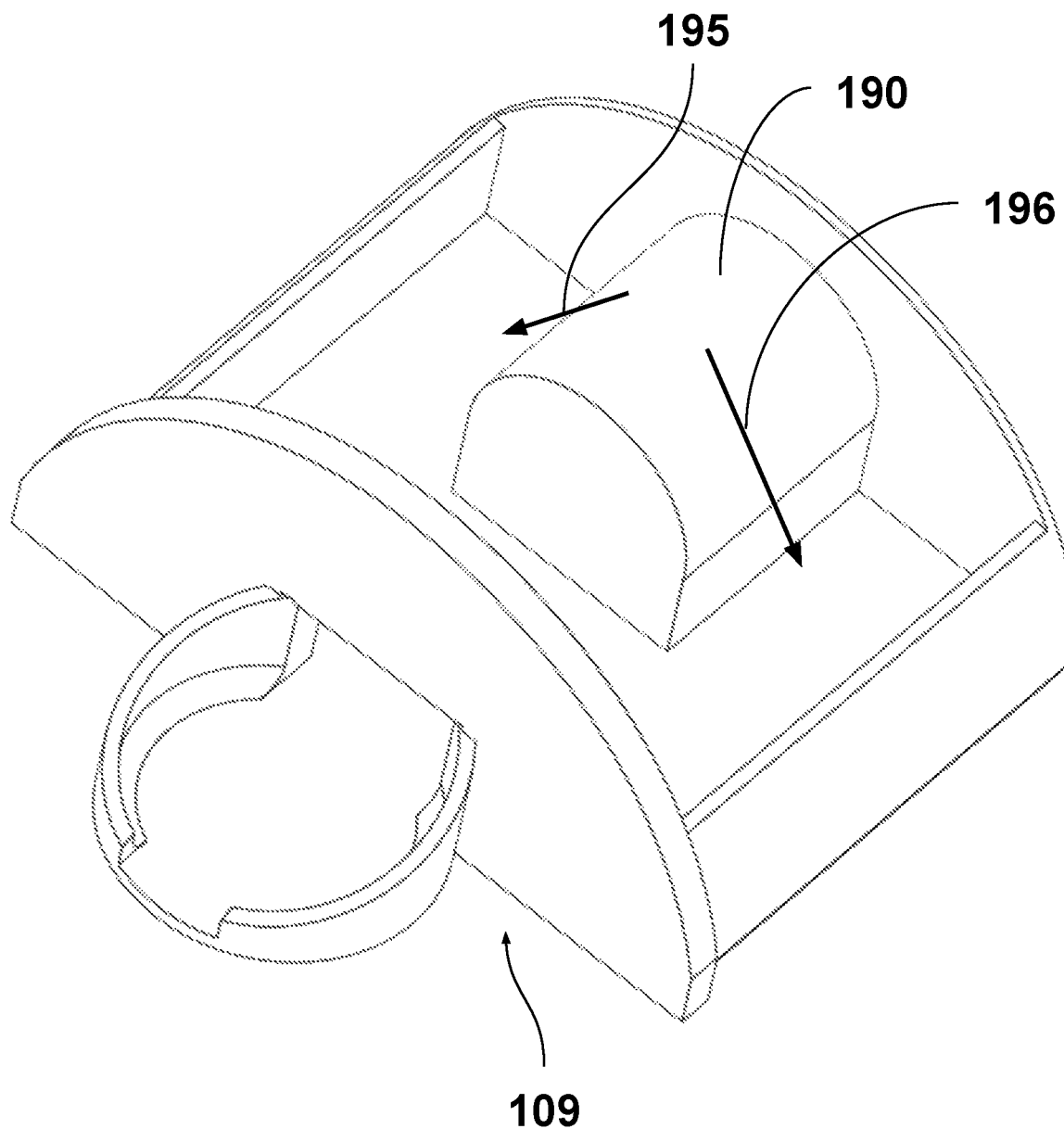
FIG. 8 is a top front perspective view of the collector.

FIG. 8 illustrates collector 109 which includes deflector hump 190 which is the point of contact with water 183 leaving bucket spout 182 (See FIG. 7). As water leaves wheel 130 between approximately 11:30 o'clock and twelve o'clock position the water pours into the left side of deflector hump 190, this flow of water is illustrated as deflector water flow left 195 in FIG. 8. As wheel 130 continues to rotate through approximately positions twelve o'clock and 1:30 o'clock water pours into the right side of deflector hump 190, this flow of water is illustrated as deflector water flow right 196 in FIG. 8. In this embodiment the shape of deflector hump 190 has a rectangular base which is then rounded off at its top. This particular embodiment reduces the distance water pours from bucket 150 into collector 109 which reduces splashing and noise. Additional embodiments utilize different size, shapes or dimensions for the deflector or may omit this feature all together.

Figure 9:
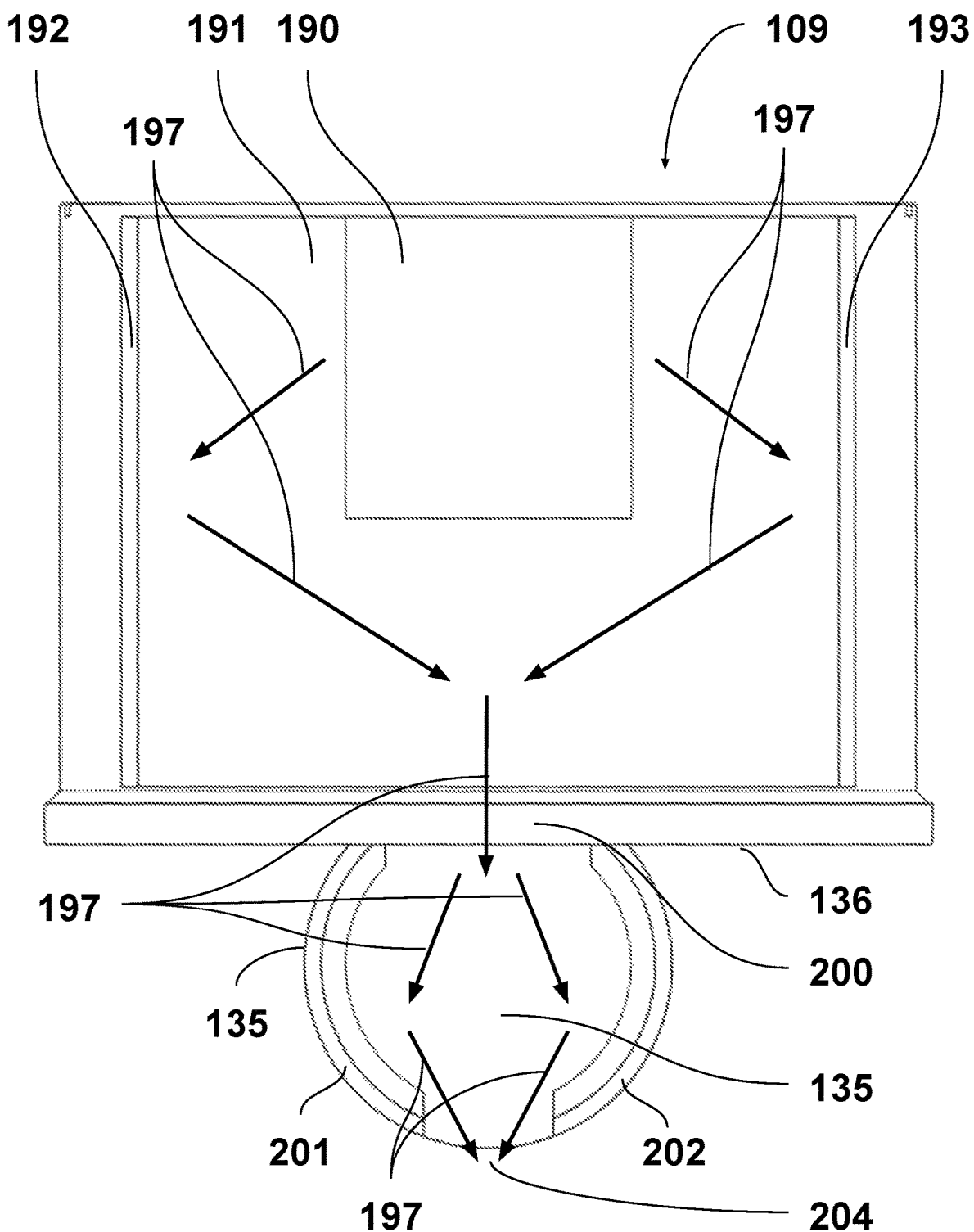
FIG. 9 is a top plan view of the collector.

FIG. 9 is a top elevation view of collector 109 which further illustrates how deflector hump 190 reduces the pulsing water wave energy as the water is dropped from bucket 150. As the water hits the deflector hump 190 it runs down the deflector hump 190 towards the collector bottom floor 191 and the momentum of the water propels the water initially into collector left wall 192. Water direction flow arrows 197 in FIG. 9 illustrate the flow of water through collector 109. The benefit of this action is that it the water wave created by dropping from bucket 150 loses energy by hitting collector left wall 192. This loss in water wave energy helps to reduce the pulsing action of the water which eventually leaves collector 109 via spout 135. As wheel 130 continues to rotate pass the twelve o'clock position water hits deflector hump 190 but now runs down deflector hump 190 to collector bottom floor 191 and the momentum of the water propels the water into collector right wall 193 causing a similar loss in water wave energy. Water then passes through spout entrance 200. Further loss in wave energy occurs as water hits spout entrance wall left 201 and spout entrance wall right 202. Water eventually leaves collector 109 through spout exit 204. Another embodiment of collector 109 is to allow for the water to be discharged from the wheel to a collector oriented in front of the wheel as opposed falling to the center collector as is featured in this embodiment. Additional embodiments cover various shapes for the spout.

Figure 10:
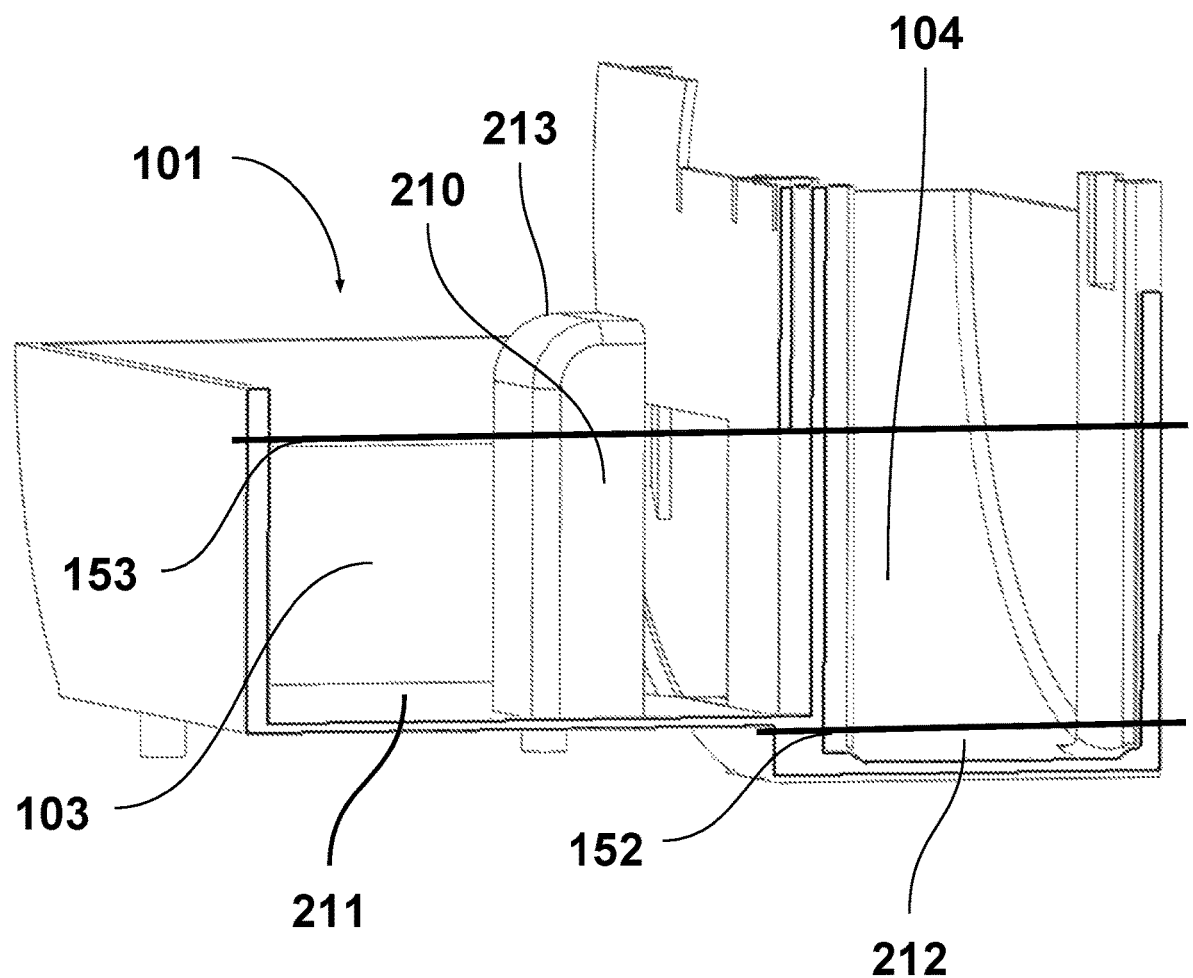
FIG. 10 is a side section view of the lower basin showing the flow of water from the high reservoir to the low reservoir.

FIG. 10 illustrates a cross-sectional view of lower basin 101 cut down its approximate center. Water leaves spout 135 (see FIG. 3) as a single stream and it comes in contact with deflector 210. Deflector 210 has a rectangular cross-sectional shape which protrudes up from front reservoir floor 211. Deflector leading edge 213 is rounded in order to help minimize splashing of water. Upon contacting deflector 210 water runs down deflector 210 and into the water being held in front reservoir 103. Deflector 210 reduces the splashing noise which occurs when water leaves spout 135 (see FIG. 3) and hits the water stored in front reservoir 103. Front reservoir floor 211 is at a higher elevation then rear reservoir floor 212. With usage by animals water drains from maximum water level 153 to minimum water level 152. As the water level drops to the same level as front reservoir floor 211, to the user, watering device 100 will appear to be empty. However, some water will still be in rear reservoir 104 and this will allow the wheel 130 to still supply water to spout 135 (see FIG. 3). This feature acts as a visual queue which will tell the user that watering device 100 should be refilled with water before watering device 100 is completely empty of water.

Figure 11:
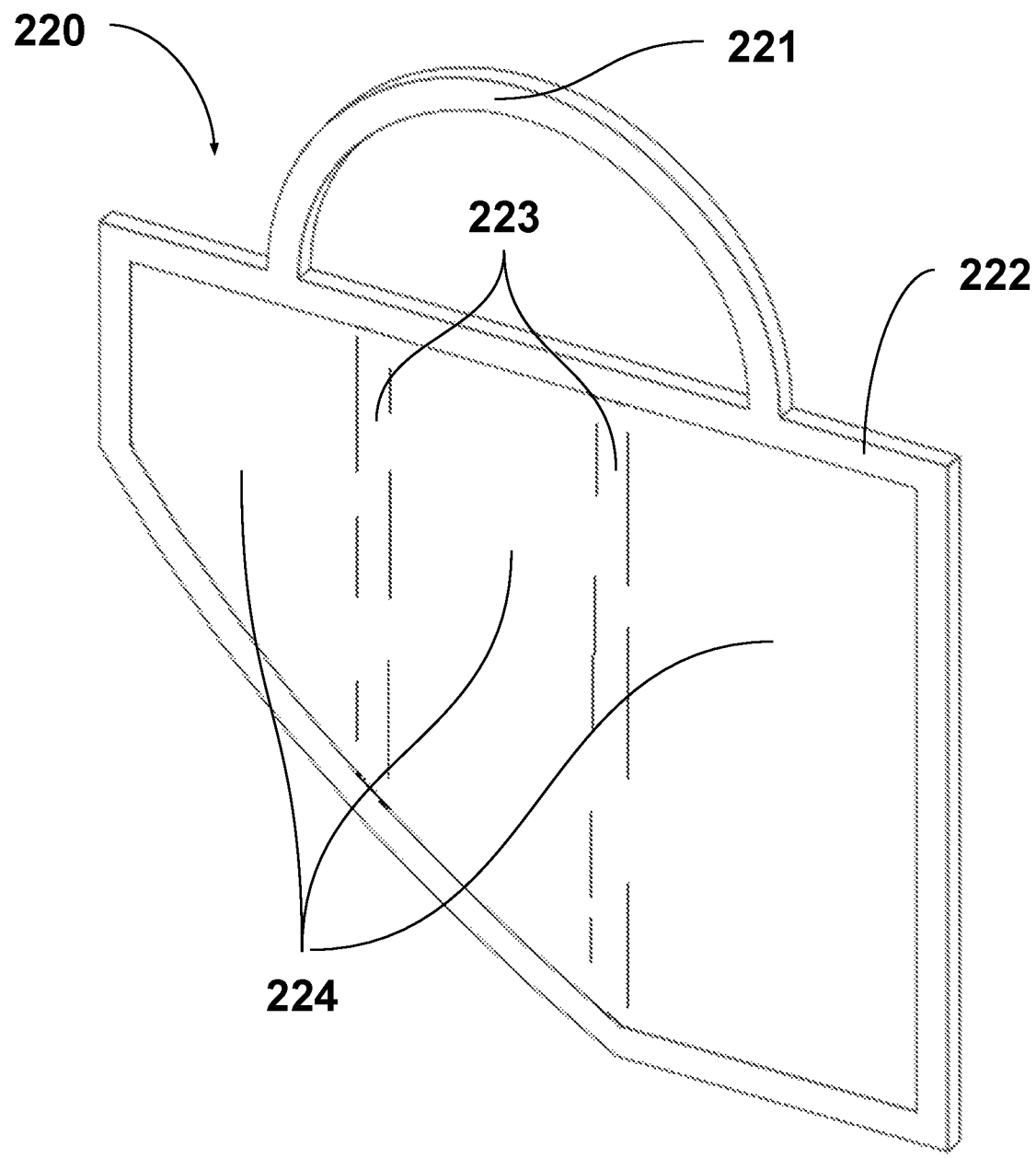
FIG. 11 is a front perspective view of one filter.

FIG. 11 depicts an impurity absorbing or catching filter 220. Filter 220 includes a frame with outer edge frame 222, two inner transverse support 223 and filter handle 221. Three pockets 224 are formed from outer edge frame 222 and the inner transverse support 223. In one embodiment, the pockets 224 can be filled with charcoal and a natural or synthetic fiber material placed on the front and rear of filter 220 to form pockets of charcoal which can remove impurities from the water. Impurities include food and fur which may enter the water after exposure to animals, such as dogs and cats, while these animals are taking water from the front reservoir 103 (see FIG. 2). In another embodiment other types of material or materials which increase the effectiveness of the filter or a mixture of types of materials may be placed in pockets 224. One embodiment may be to leave these materials out altogether. Additional embodiments may use different sizes and shapes to create filter 220 including changing the number of pockets 224.

Figure 12:
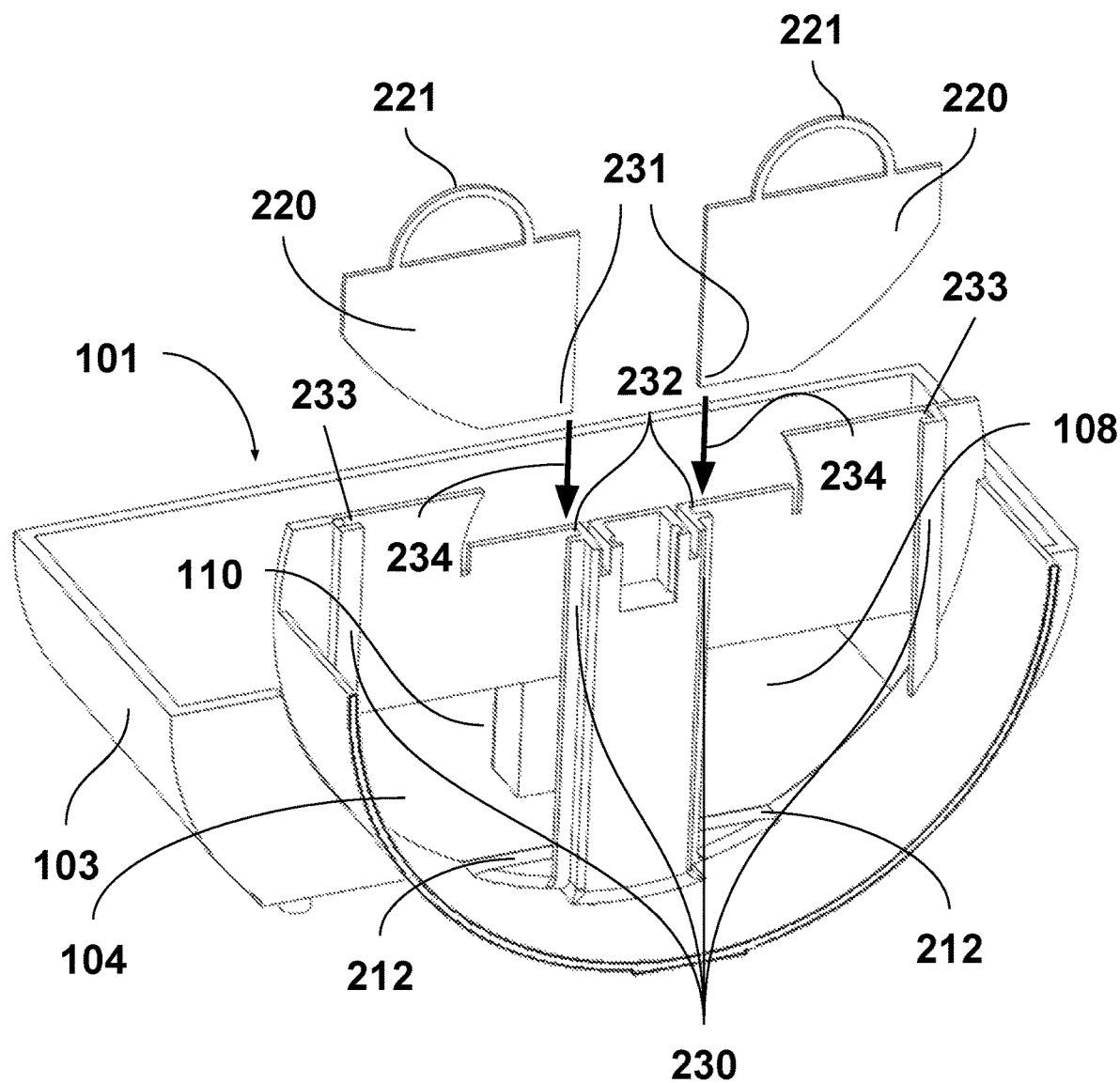
FIG. 12 is perspective exploded view showing the interlocking relationship of the filters to the lower basin.

FIG. 12 depicts the rear of lower basin 101 with the rear wall of rear reservoir 104 (see FIG. 2) removed in order to view how filters 220 are inserted into filter slots 230. To insert filter 220 into filter slots 230 the user aligns filter lead edge point 231 with the corresponding center filter slot 232. Slot alignment direction 234 illustrates how filter lead edge point 231 is inserted into filter slots 230. The user then lowers filter 220 into center filter slot 232 until is eventually reaches outer filter slot 233. With filter 220 now located at the top of outer filter slot 233 the user than continues to lower filter 220 until it comes to rest on rear reservoir floor 212. The user performs the lowering action by holding filter handle 221. One advantage for the user of the design of filter 220 is that there is not a left filter nor right filter for watering device 100. An individual filter 220 can slide in to cover left filter inlet hole 108 or right filter inlet hole 110 by simply flipping the filter 220, there is no need for a specific filter designed for left filter inlet hole 108 and another for right filter inlet hole 110. Once in this position filter 220 is in the correct position to filter water flowing through it from front reservoir 103 to rear reservoir 104. An additional embodiment may be for different designs to insert and hold filters in left filter inlet hole 108 and right filter inlet hole 110.

Figure 13:
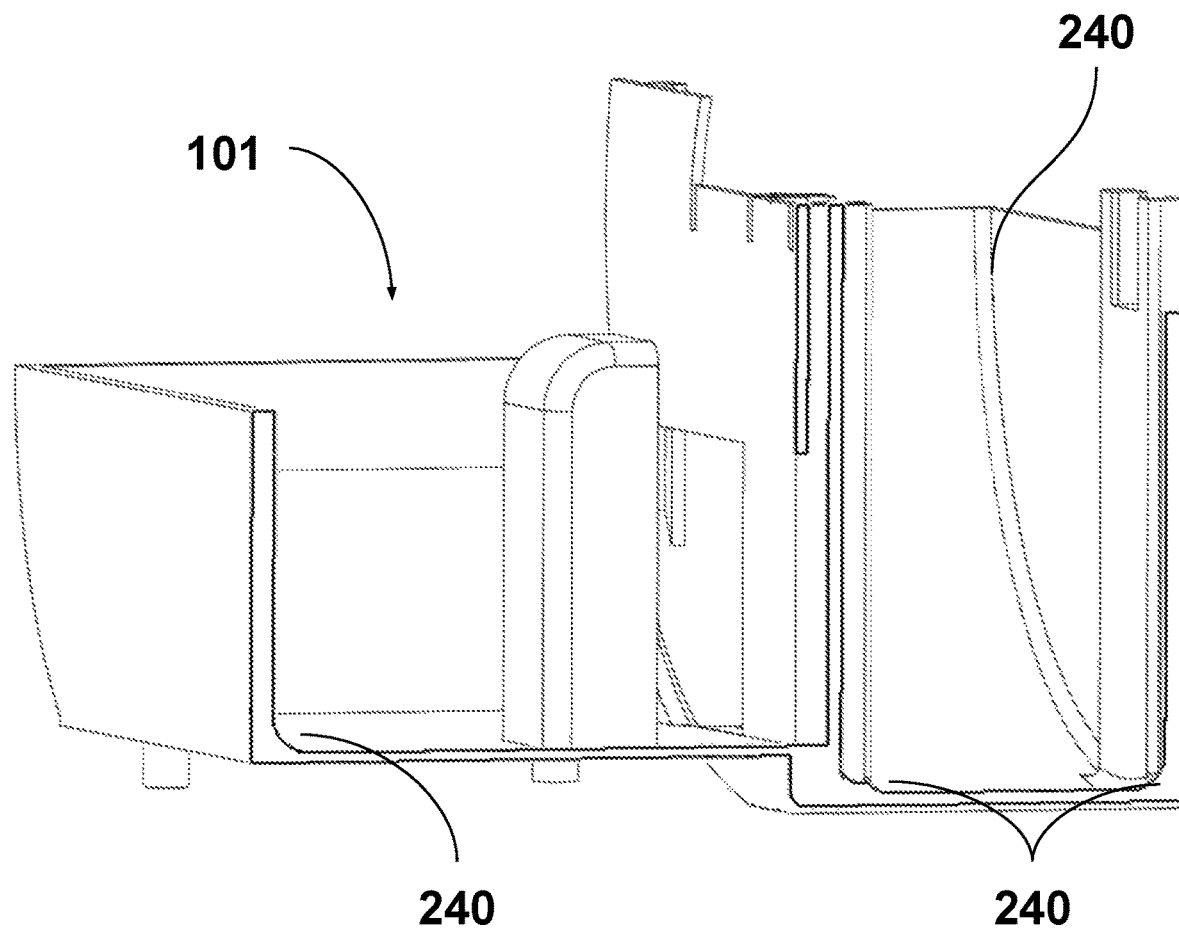
FIG. 13 is a section view of the lower basin showing the curved shaped of the corners.

FIG. 13 illustrates a side elevation of lower basin 101 with the right side cut away to reveal the filleted edges 240 of the front reservoir 103 and rear reservoir 104. By filleting the connection point of two surfaces the opportunity for laminar flow of water is reduced. At locations of laminar flow opportunities for biofilm to begin to grow may increase. Biofilm may contribute to the growth of bacteria, fungus, microbes, protozoa or other living organisms. In addition, users may physically see growth of microbial, fungal or parasitic organisms in corners or crevices in pet watering devices. These corners and crevices become more difficult to physical clean due to size restrictions. Larger diameter filleted corners reduce the opportunity for biofilm growth and therefore make pet fountains easier to clean. The portions of device 100 that are exposed to water are thus free of sharp corners. Corners which have a radius less than 5 mm are sharp in this context. In this embodiment, all fillets exposed to water are 5 mm or larger to facilitate the reduction of biofilm buildup and to allow for easy cleaning. A minimum fillet diameter of 5 mm allows hand cleaning of lower basin 101 to occur plus reduce the chance of laminar flow water movement. In one embodiment watering device 100 is produced with acrylonitrile butadiene styrene (ABS) plastic combined with antimicrobial agents such as PARX Saniconcentrate PE0018. The antibacterial agent can be about two percent of the ABS by volume to provide antimicrobial properties to the ABS. Tests with agents such as this have concluded the ABS plastic includes antibacterial properties as measured according to ISO 22196. The use of the large fillets and the lack of sharp corners along with the antimicrobial material can be used with water delivery devices in pet fountains other than water wheels. For example, pet fountains with electric pumps can benefit from the large fillets and antimicrobial materials.

Figure 14:
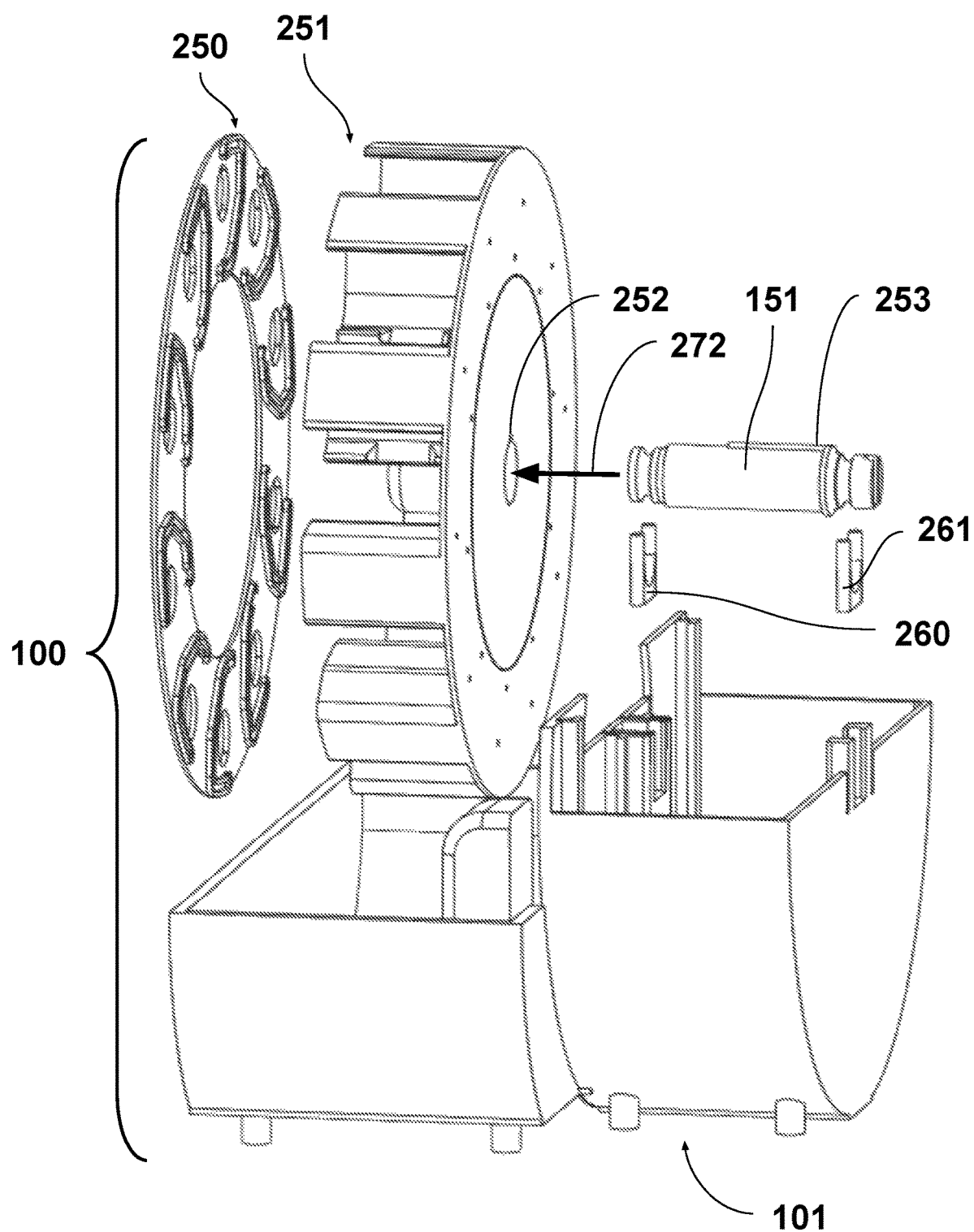
FIG. 14 is a perspective, exploded view depicting the connection between the wheel, wheel axle, supports and the lower basin.

FIG. 14 is a perspective exploded view showing the interlocking relationship between wheel front wall 250, wheel rear assembly 251, wheel axle 151, axle support front 260, axle support rear 261 and lower basin 101. The aforementioned wheel 130 includes of two pieces which in one embodiment includes wheel front wall 250 and wheel rear assembly 251; these two pieces may be made of plastic and may be ultrasonically welded together to form one wheel 130. This simple design may enable a more affordable injection molded piece or pieces to be manufactured. In one embodiment wheel axle 151 slides into wheel rear assembly 251 and becomes semi-locked given the tight dimensional tolerance between the two pieces as illustrated by direction of shaft insertion arrow 272. In another embodiment wheel axle 151 and wheel rear assembly 251 are connected with fasteners, adhesives, welds, or using other configurations. One embodiment uses a notch and hook function to hold the two pieces together. In one embodiment shaft key 253 aligns with corresponding wheel keyway 252 so that wheel rear assembly 251 does not rotate on wheel axle 151. In other embodiments different methods can be used to connect wheel axle 151 to wheel 130 including eliminating the need for wheel axle 151 by making it part of wheel 130.

Figure 15:
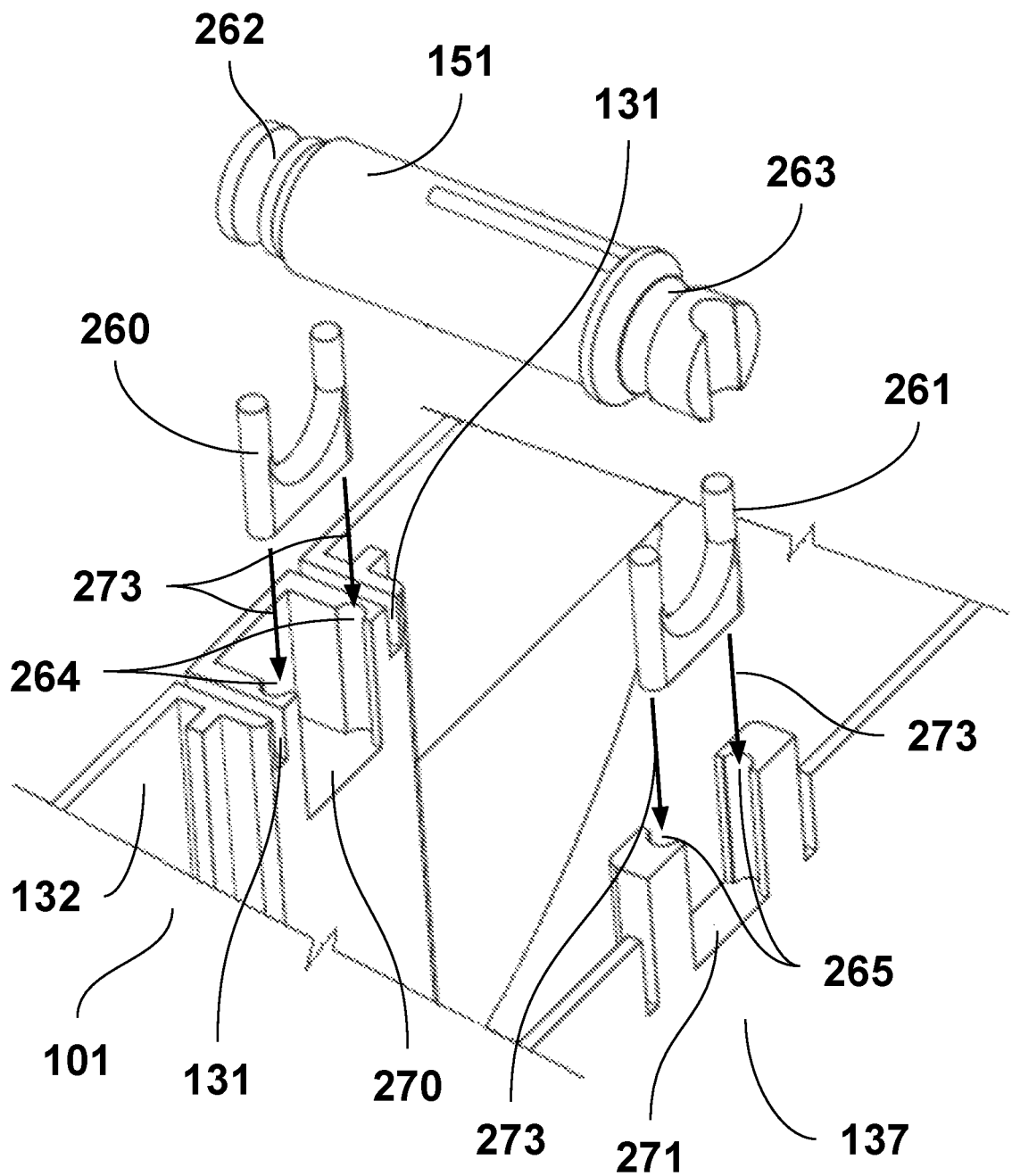
FIG. 15 is a perspective, exploded view showing the interlocking relationship of the slide out axle support insert and the wheel axle.

FIG. 15 illustrates the connection between wheel axle 151 and axle support front 260 and axle support rear 261. Axle support front 260 has a circular cross-sectional shape which forms a channel in which axle front groove 262 can sit in and rotate. In a similar fashion, axle support rear 261 has a similar cross-sectional shape which form a channel in which axle rear groove 263 can sit in and rotate. Direction of support slot insertion arrows 273 illustrates how axle support front 260 and axle support rear 261 are placed into axle front groove 264 and axle rear groove 265 respectively. In this embodiment wheel axle 151, axle support front 260 and axle support rear 261 are made of a material that has high stiffness, low friction, and excellent dimensional stability such as Delrin® plastic. By making these three parts of a material such as Delrin® plastic, watering device 100 would have low noise and a longer life before wearing out. In addition, this feature enables the user to quickly remove wheel 130 for cleaning. Additional embodiments for wheel axle 151, axle support front 260 and axle support rear 261 may have different sizes, shapes and materials used for the adjoining point between shaft and wheel. Other embodiments may use the same construction materials for all or some of the parts of watering device 100. Additionally wheel axle 151 may be different cross-sectional shapes like squares, rectangles, etc.

FIG. 15 also illustrates how axle support front 260 and axle support rear 261 both slide into grooves 264 and 265 defined by upper portions of lower basin 101. Axle support front 260 can be pressed into support slot front 270, and similarly, axle support rear 261 can be pressed into support slot rear 271. Support slot front 270 is located at the top of front support wall 132. Similarly, support slot rear 271 is located at the top of rear support wall 137. Additionally, FIG. 15 illustrates how axle support front 260 and axle support rear 261 are replaceable if they wear out. Axle support front 260 slips into support slot front 270. Similarly, axle support rear 261 slips into support slot rear 271. Watering device 100 comes assembled with axle support front 260 and axle support rear 261 in position, however, the user can replace these parts due to wear. Close tolerances hold axle supports 260 and 261 in place and they can be slid out and changed for new parts. When the user applies an upward force on axle supports 260 and 261 they can be removed, in a similar fashion, when a downward force is supplied these parts can be installed. In another embodiment this features is not included.

Returning to FIG. 14, in this embodiment wheel axle 151 can be removed from wheel 130. This embodiment treats wheel axle 151 as a wear part which can be replaced in order to prolong the life of watering device 100. In another embodiment different materials can be used for wheel axle 151. Additionally, another embodiment may not include this feature at all or wheel 130 may be made entirely of the same material which may be Delrin® plastic.

Figure 16:
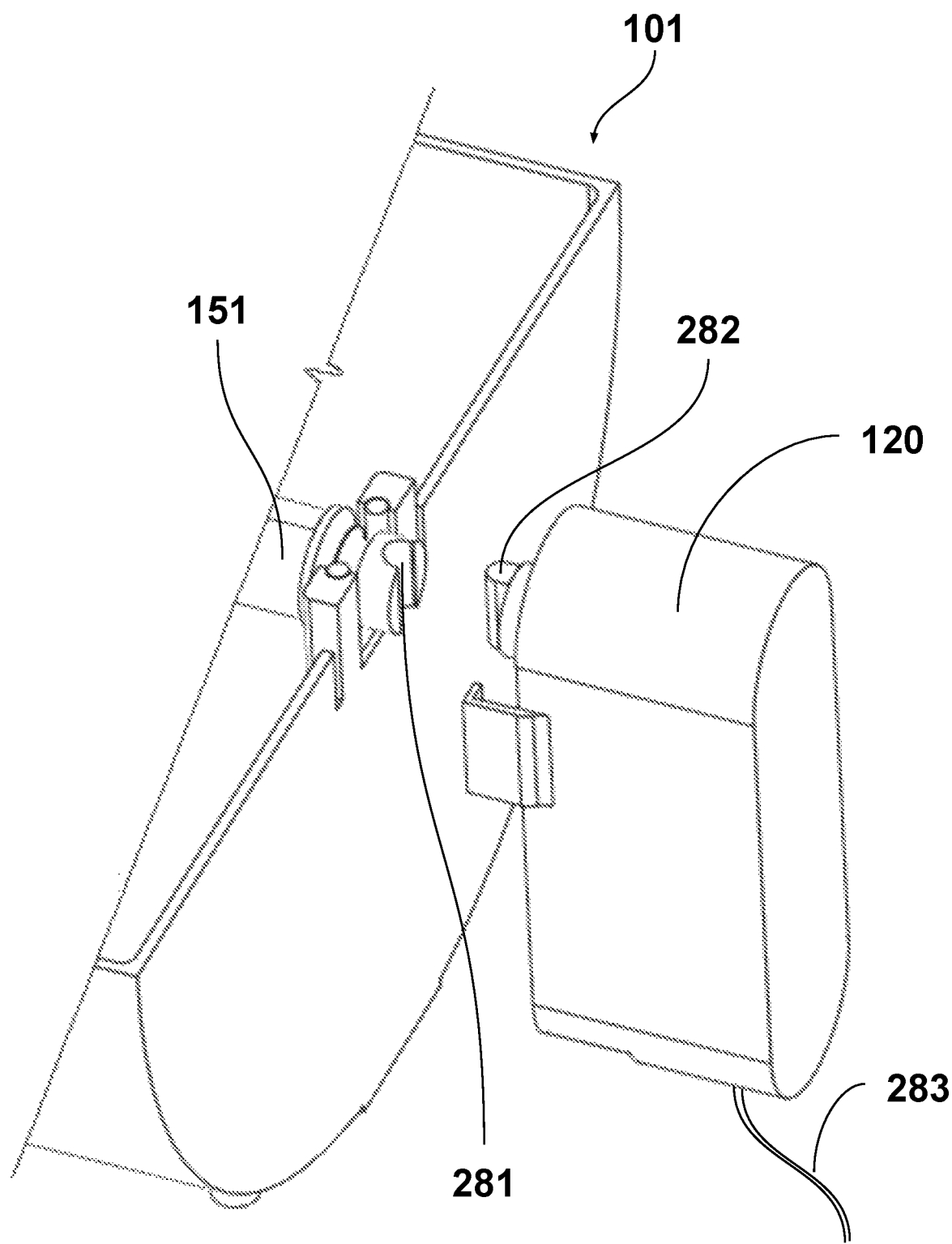
FIG. 16 is a perspective exploded view showing the connection between the rear axle support and the motor.

FIG. 16 illustrates an embodiment of the quick connect connection between wheel axle 151 and motor housing 120 with the front of lower basin 101 removed for greater clarity. In general, the quick connect provides a connection between the motor output device and wheel axle 151 upon the correct placement of motor housing 120 onto the basin. The connection is formed without the need for the user to insert a fastener or manipulate a connector. In the exemplary configuration, the rear end of wheel axle 151 has a circular cross-section which extends rearward to create a cylinder into which a transverse semi-circle notch is defined. This semi-circle notch is referred to as wheel connect 281. Motor connect 282 has a corresponding shape which couples with wheel connect 281. Other shapes and configurations can be used. Motor connect 282 connects wheel 130 to a direct current (DC) motor located within motor housing 120 which rotates wheel 130 and serves as the junction between motor connect 282 and motor housing 120. The electrical motor within motor housing 120 is supplied electricity through power cord 283 or batteries. Motor connect 282 is formed from a cylinder into which a rectangular shape protrudes which than has its two side rounded to create a protrusion which perfectly matches with wheel connect 281 as a male-female connection. The feature of this connection is that it may produce a quick disconnect for the user. In other embodiments this connection is different sizes and shapes. One embodiment uses magnets to make this connection.

Figure 17:
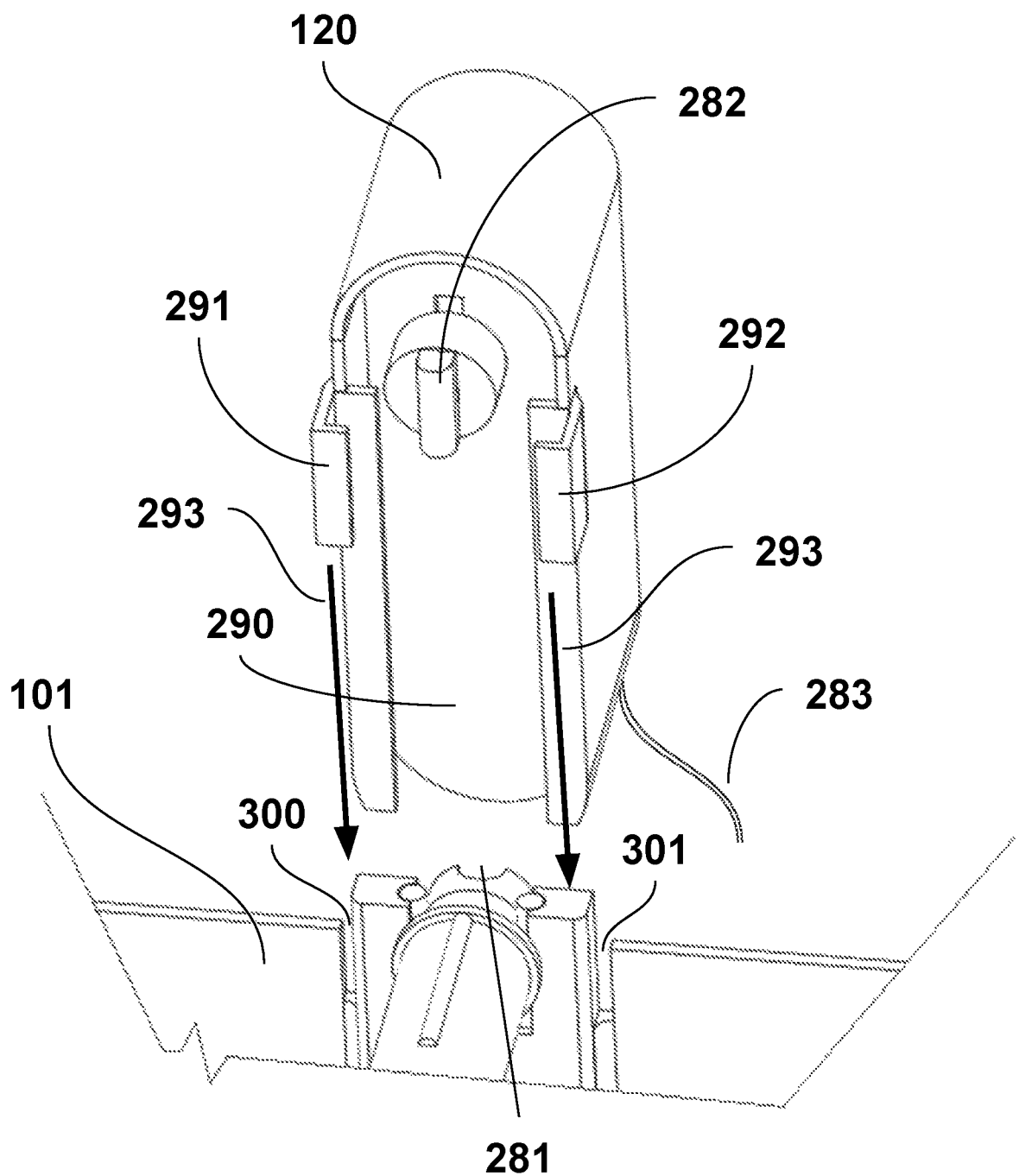
FIG. 17 is a perspective exploded view showing the connection between the motor holder and the lower basin.

FIG. 17 illustrates the slot connection between motor housing 120 and lower basin 101. Motor housing 120 has two extensions forward from motor body front wall 290. The extensions are rectangular in shape and form left motor support 291 and right motor support 292. In lower basin 101 two rectangular slots, left motor slot 300 and right motor slot 301 are defined to receive motor housing 120 and position motor connect 282 so it is aligned with wheel connect 281 (See FIG. 16). Motor installation direction arrows 293 illustrate how motor housing 120 is slid on to lower basin 101. Motor housing 120 is thus readily removable from and replaceable onto lower basin 101 because the user can simply slide motor housing 120 up and off of lower basin 101 and then replace it after basin 101 has been cleaned by sliding motor housing 120 back on to basin 101.

In this embodiment the electronic controller for the electronic motor located inside motor housing 120 enables motor connect 282 to be in a vertical position so it can be aligned with wheel connect 281 when wheel connect 281 is in a similar vertical position to receive.

Figure 18:
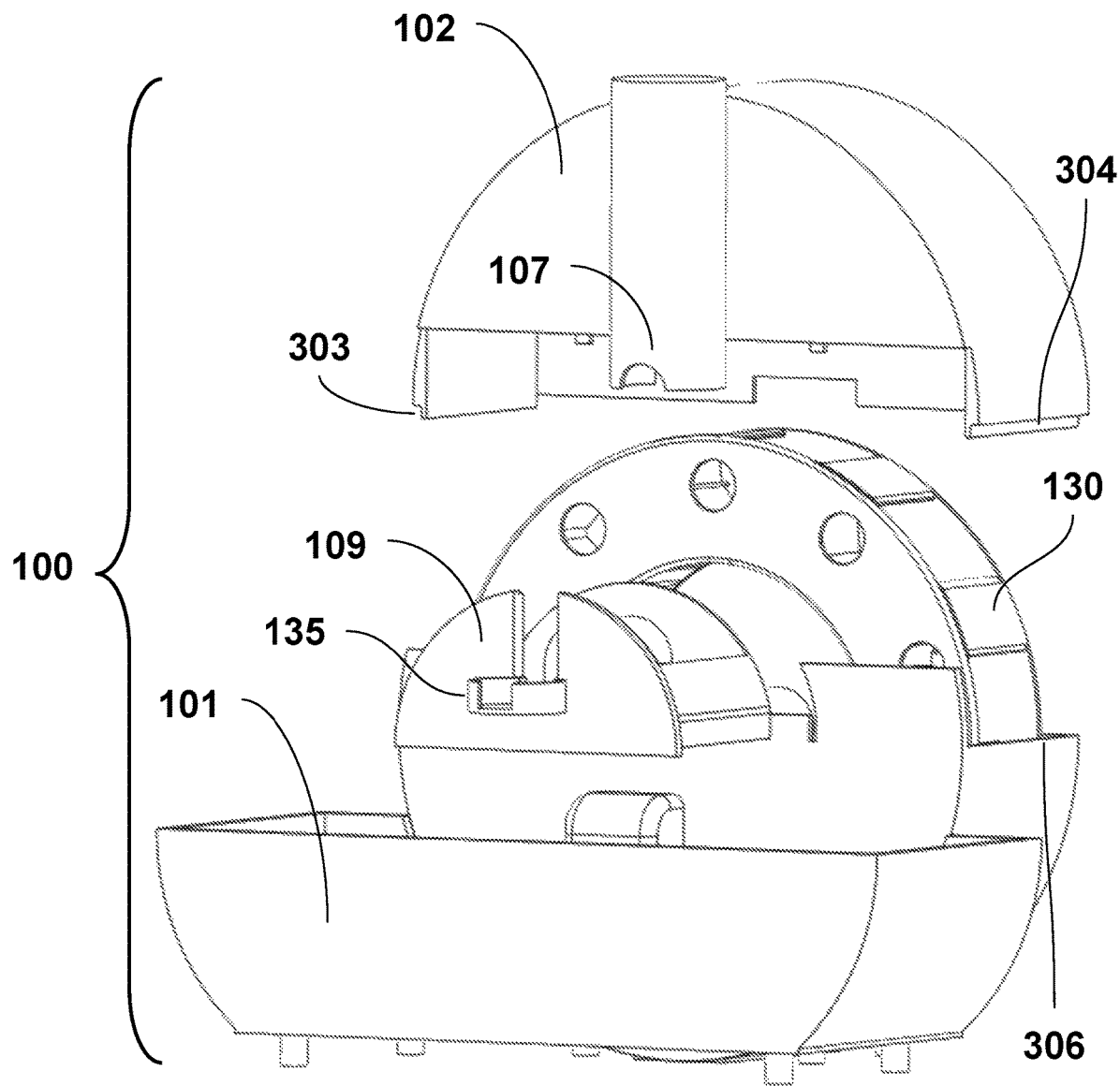
FIG. 18 is a perspective exploded view showing the cowl connection to the lower basin.

FIG. 18 illustrates cowl 102 and its connection with collector 109 and lower basin 101. The shape of cowl 102 is a semi-circle shape which together with the rear of lower basin 101 makes a complete circle shape and essentially forms a complete cylinder in order to encase wheel 130 while wheel 130 is rotating. Lower basin 101 includes a basin hold left (similar to basin hold right) and basin hold right 306 (pictured) and cowl 102 has a corresponding cowl left clip 303 and cowl right clip 304. When the user lowers cowl 102 on to lower basin 101, the cowl left clip 303 and cowl right clip 304 align and basin hold left and basin hold right 306 to position cowl 102 in the correct position over lower basin 101. In addition, spout cover 107 slides over spout 135 to form a perfect fit. This motion by the user seals wheel 130 inside watering device 100. In various embodiments different types of connections can secure cowl 102 to lower basin 101 including but not limited to bayonet designs, spring clips, latches and button activated clips. In another embodiment the placement of the cowl 102 activates motor housing 120 to automatically start. This action can be achieved through different embodiments of sensors. An additional embodiment of the cowl is that it could be made of transparent plastic or containing transparent plastic viewing windows.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A pet fountain, comprising:
a basin adapted to hold water;
a collector having an outlet disposed above at least a portion of the basin;
a water wheel rotatably mounted with respect to the basin; the water wheel configured to move water from the basin to the collector such that water flows out of the outlet and falls into the basin; the pet fountain defining a flow of water accessible to pets for drinking;
the water wheel including a plurality of buckets adapted to collect water from the basin when the water wheel positions the bucket in the basin;
wherein the water wheel defines means for leveling the water level in each bucket such that the buckets deliver constant volumes of water to the collector when different levels of water are in the basin;
the water wheel defining an air bubble hole in each bucket adapted to release trapped air bubbles to reduce pet fountain operation noise; and
a motor that rotates the water wheel.

2. A pet fountain, comprising:
a basin adapted to hold water;
a collector having an outlet disposed above at least a portion of the basin;
a water wheel rotatably mounted with respect to the basin; the water wheel configured to move water from the basin to the collector such that water flows out of the outlet and falls into the basin; the pet fountain creating a flow of water accessible to pets for drinking;
a motor that rotates the water wheel;
the water wheel including a plurality of buckets; each bucket adapted to collect water from the basin when the water wheel positions the bucket in the basin; and
the water wheel defining a leveling opening for each bucket; the leveling opening allowing water to drain from the bucket.

3. The pet fountain of claim 2, wherein the water wheel defines an air bubble hole in each bucket adapted to release air bubbles to reduce pet fountain operation noise.

4. The pet fountain of claim 3, wherein each bucket includes a bucket leading edge wall disposed along an outer rim of the water wheel, a bucket bottom wall extending radially inwardly, and a bucket dumping wall extending from the bucket bottom wall to an inner rim of the water wheel.

5. The pet fountain of claim 2, wherein the collector defines first and second paths for the flow of water.

6. The pet fountain of claim 2, wherein each bucket is spaced from adjacent buckets by a gap of 35 mm to 55 mm.

7. The pet fountain of claim 2, wherein all portions of the basin and collector that receive water are free of sharp corners with each corner having a fillet of at least 5 mm.

8. The pet fountain of claim 2, wherein the motor is connected to the water wheel with a quick connect; the motor being removably and replaceably carried by the basin.

9. A pet fountain, comprising:
a basin adapted to hold water;
a collector having an outlet disposed above at least a portion of the basin;
a water wheel rotatably mounted with respect to the basin; the water wheel configured to move water from the basin to the collector such that water flows out of the outlet and falls into the basin; the pet fountain defining a flow of water accessible to pets for drinking;
the water wheel including a plurality of buckets; each of the buckets adapted to gather water from the basin and dispense water to the collector;
the water wheel defining a leveling opening for each bucket; the leveling opening allowing water to drain from the bucket such that each bucket dispenses about the same volume of water to the collector regardless of how much water was gathered by the bucket; and
a motor that rotates the water wheel.

10. The pet fountain of claim 9, further comprising a water filter carried by the basin.

11. The pet fountain of claim 9, further comprising a cowl that is removably connected to the basin; the cowl covering the water wheel when the cowl is connected to the basin; and a sensor adapted to automatically start the motor when the cowl is connected to the basin.

12. The pet fountain of claim 9, wherein the motor is adapted to rotate the water wheel from four to fourteen revolutions per minute.

13. The pet fountain of claim 9, further comprising means for removing air bubbles from the buckets.

14. The pet fountain of claim 1, further comprising a water filter carried by the basin.

15. The pet fountain of claim 1, further comprising a cowl that is removably connected to the basin; the cowl covering the water wheel when the cowl is connected to the basin; and a sensor adapted to automatically start the motor when the cowl is connected to the basin.

16. The pet fountain of claim 1, wherein the motor is adapted to rotate the water wheel from four to fourteen revolutions per minute.

17. The pet fountain of claim 1, wherein the collector defines first and second paths for the flow of water.

18. The pet fountain of claim 1, wherein each bucket is spaced from adjacent buckets by a gap of 35 mm to 55 mm.

19. The pet fountain of claim 1, wherein all portions of the basin and collector that receive water are free of sharp corners with each corner having a fillet of at least 5 mm.

* * * * *